(12) United States Patent
Wada

(10) Patent No.: US 7,411,745 B2
(45) Date of Patent: Aug. 12, 2008

(54) LARGE-APERTURE-RATIO INTERNAL FOCUSING TELEPHOTO LENS

(75) Inventor: Mitsuaki Wada, Tokyo (JP)

(73) Assignee: Nikon Corporation, Tokyo (JP)

( * ) Notice: Subject to any disclaimer, the term of this patent is extended or adjusted under 35 U.S.C. 154(b) by 128 days.

(21) Appl. No.: 11/119,913

(22) Filed: May 3, 2005

(65) Prior Publication Data
US 2005/0248857 A1 Nov. 10, 2005

(30) Foreign Application Priority Data
May 7, 2004 (JP) ............................. 2004-139123

(51) Int. Cl.
*G02B 9/14* (2006.01)
(52) U.S. Cl. ..................... 359/745; 359/785; 359/786; 359/787
(58) Field of Classification Search ............... 359/690, 359/683, 689, 694, 748, 684, 785, 745, 786–787
See application file for complete search history.

(56) References Cited

U.S. PATENT DOCUMENTS

| | | | |
|---|---|---|---|
| 4,483,597 A | | 11/1984 | Mihara ........................ 350/454 |
| 5,490,014 A | * | 2/1996 | Suzuki ........................ 359/745 |
| 5,610,769 A | * | 3/1997 | Shoji .......................... 359/745 |
| 5,717,527 A | * | 2/1998 | Shibayama .................. 359/690 |
| 5,719,703 A | * | 2/1998 | Sato ............................ 359/557 |
| 5,745,306 A | | 4/1998 | Sato ............................ 359/745 |
| 5,757,555 A | * | 5/1998 | Sato ............................ 359/684 |
| 6,115,188 A | * | 9/2000 | Nishio et al. ................ 359/690 |
| 2005/0213225 A1 | | 9/2005 | Hosoya |

FOREIGN PATENT DOCUMENTS

| | | |
|---|---|---|
| JP | 6-201988 | 7/1994 |
| JP | 8-327897 A | 12/1996 |
| JP | 11-160617 A | 6/1999 |
| JP | 2005-283719 A | 10/2005 |

* cited by examiner

*Primary Examiner*—Ricky L Mack
*Assistant Examiner*—James R Greece
(74) *Attorney, Agent, or Firm*—Miles & Stockbridge P.C.

(57) ABSTRACT

The purpose is to provide a large-aperture-ratio internal focusing telephoto lens applicable to a wider photographing area by equipping a vibration reduction function capable to satisfactorily correct a camera shake and the like with securing superb optical performance. The large-aperture-ratio internal focusing telephoto lens includes, in order from an object, a first lens group G1 having positive refractive power, a second lens group G2 having negative refractive power, and a third lens group G3 having positive refractive power. The second lens group G2 is moved along an optical axis upon changing focus from infinity to a close-range object. The first lens group G1 has at least two cemented lenses and satisfies a given conditional expression. Either one of the cemented lens satisfies a given conditional expression.

46 Claims, 18 Drawing Sheets

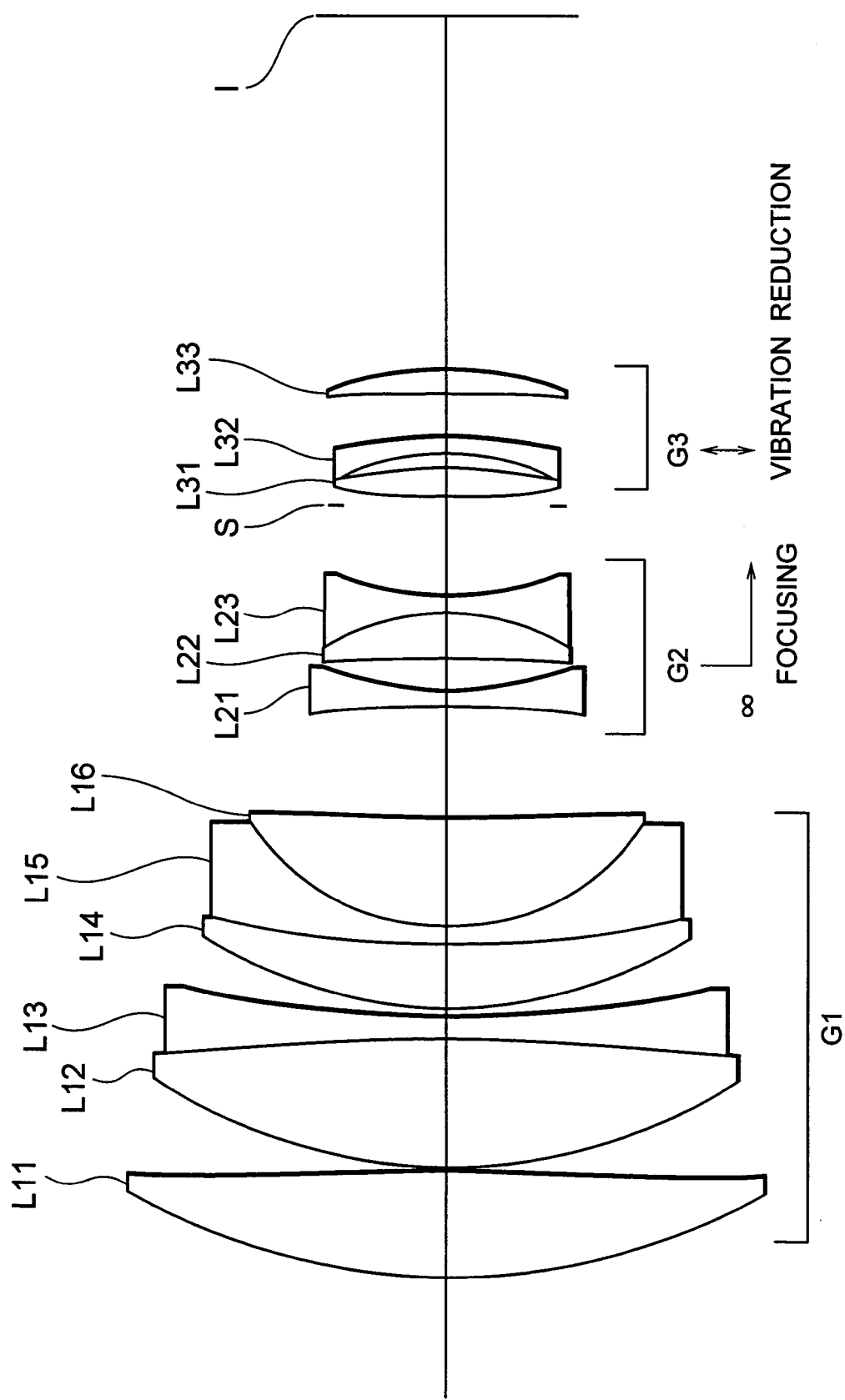

FIG. 8A
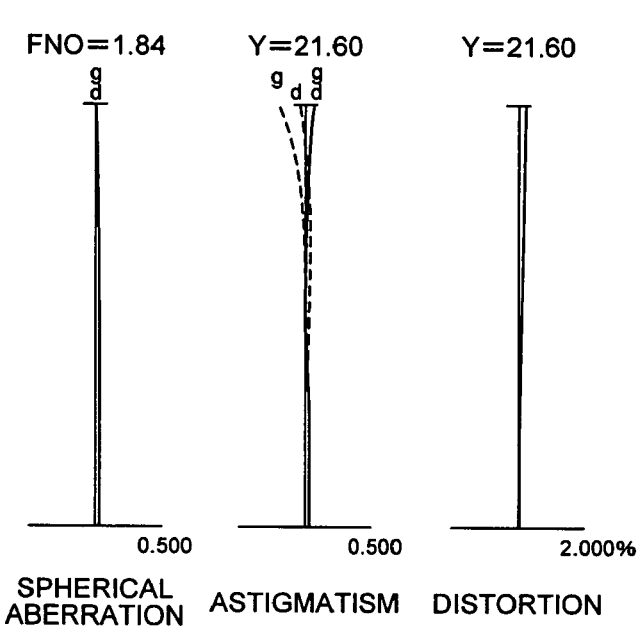
SPHERICAL ABERRATION  ASTIGMATISM  DISTORTION
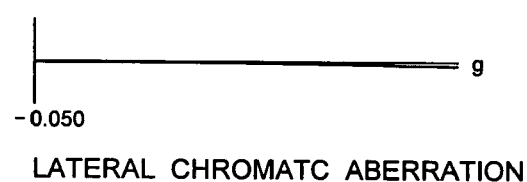
LATERAL CHROMATC ABERRATION
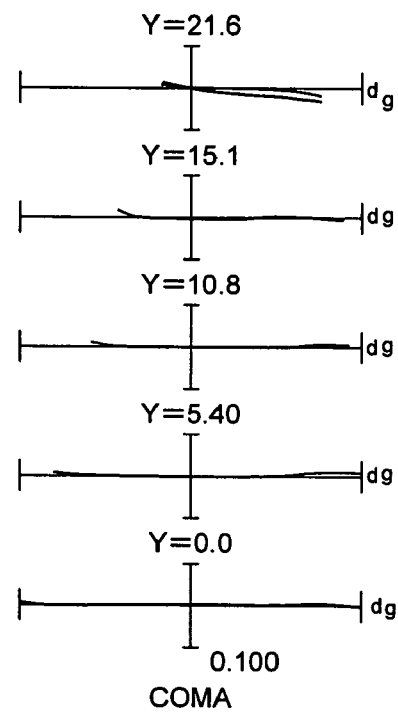
COMA
FIG. 8B
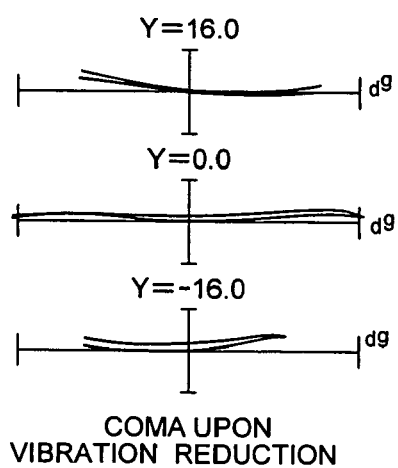
COMA UPON VIBRATION REDUCTION

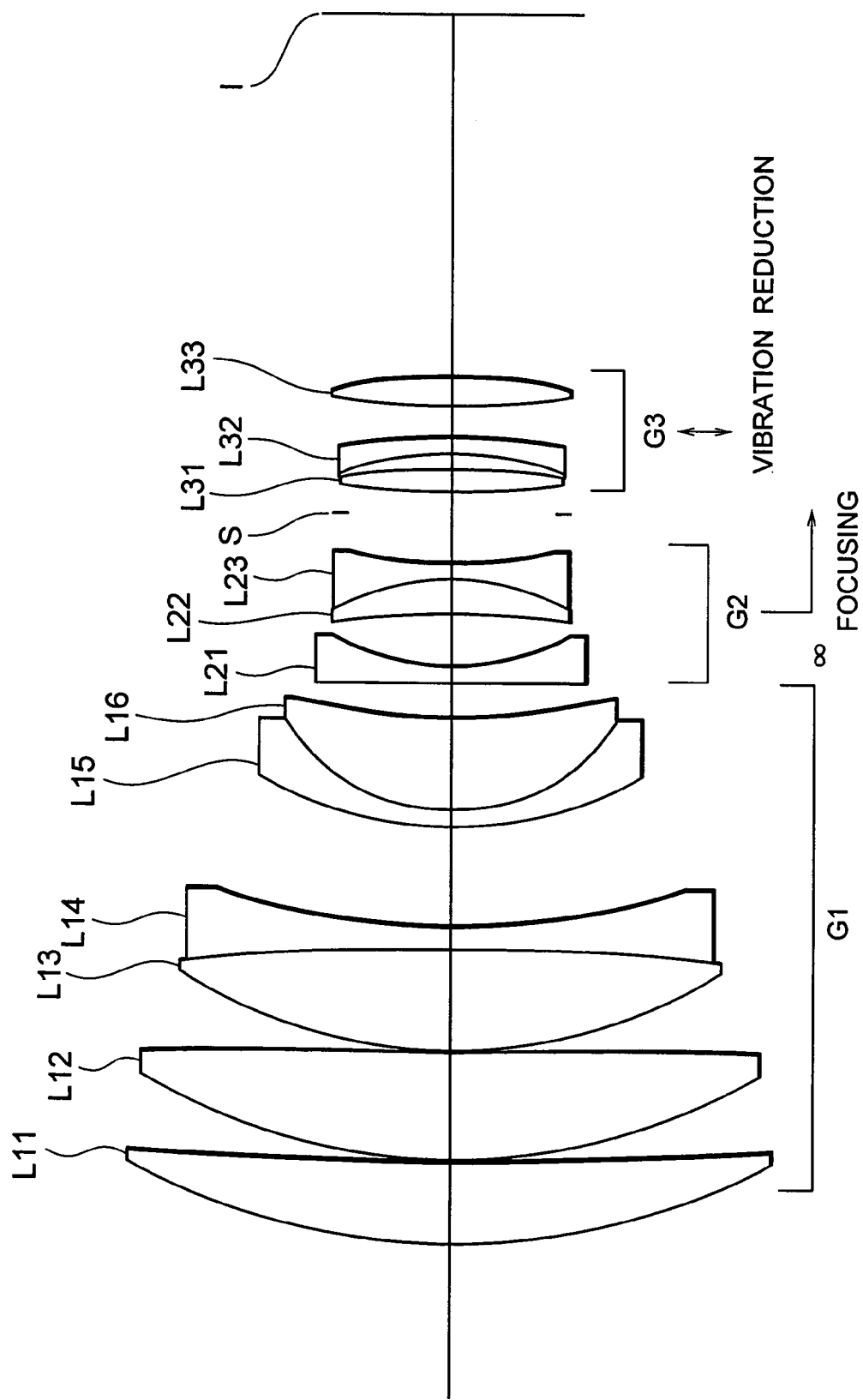

FIG.11A
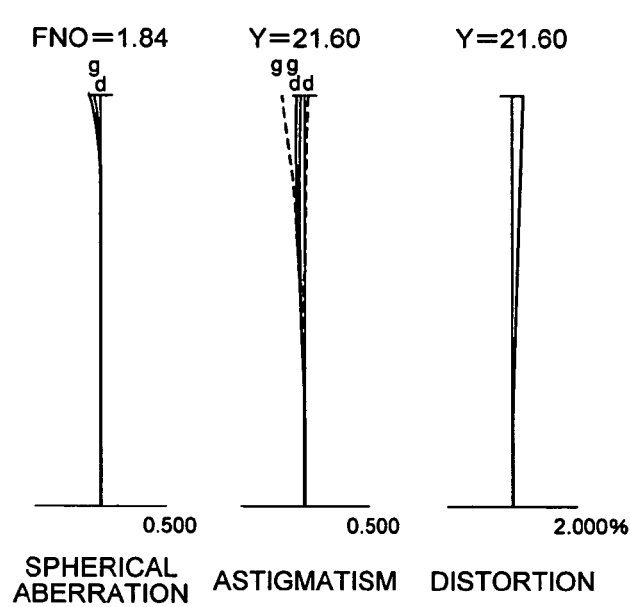
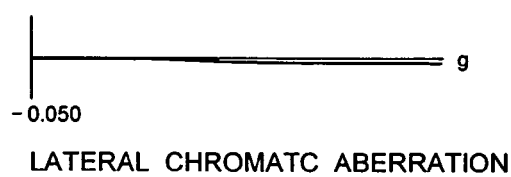
LATERAL CHROMATC ABERRATION
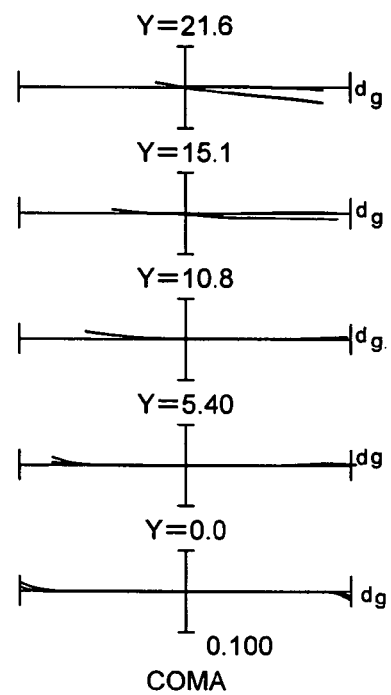
FIG.11B
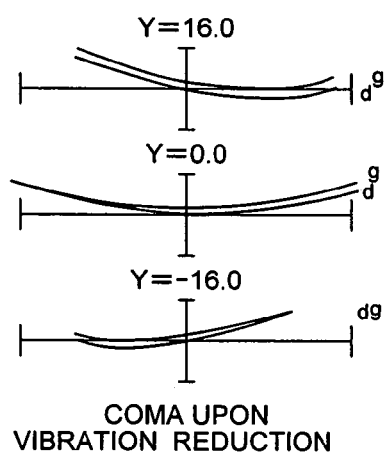

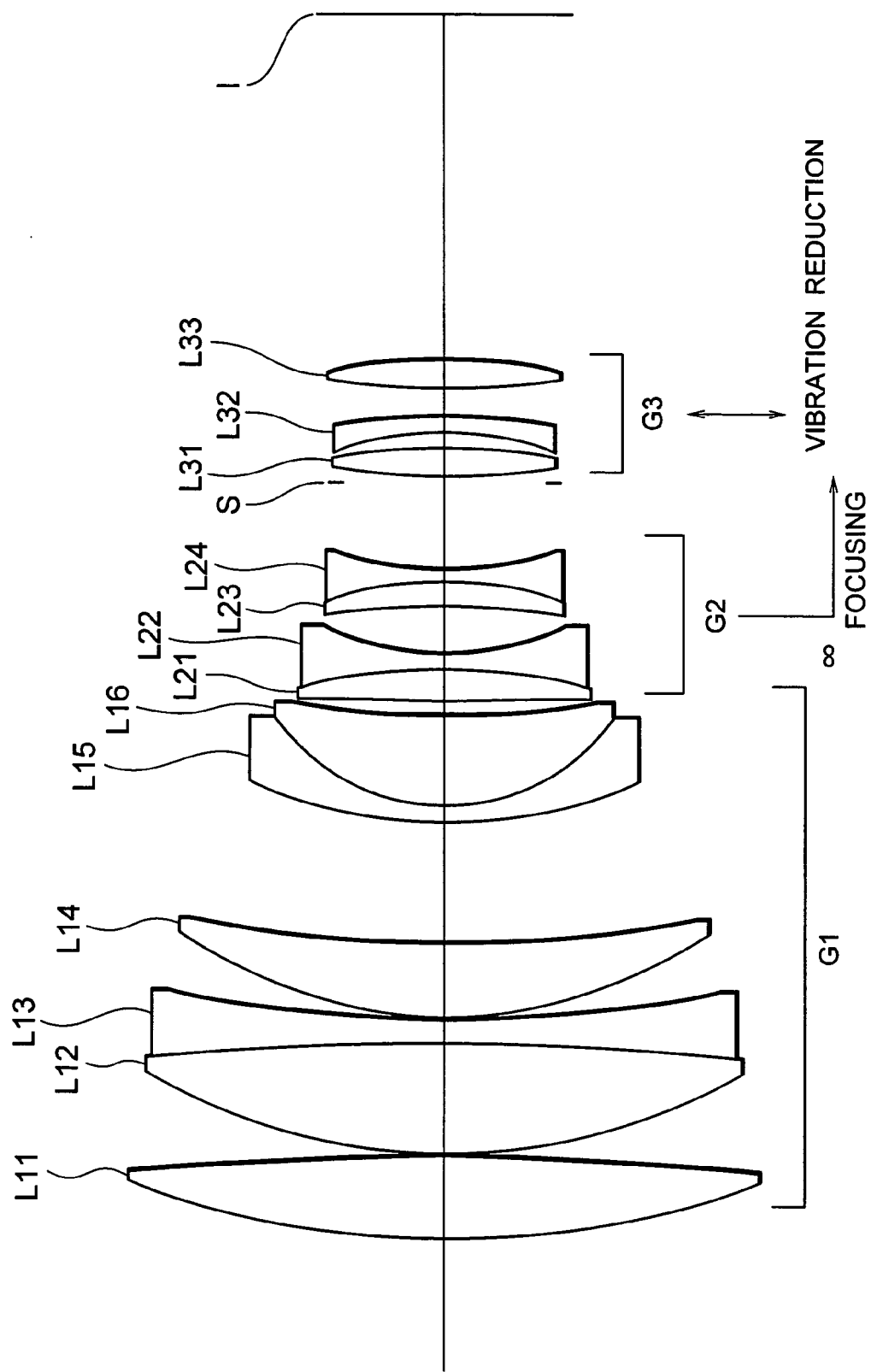

LARGE-APERTURE-RATIO INTERNAL FOCUSING TELEPHOTO LENS

The disclosure of the following priority application is herein incorporated by reference:

Japanese Patent Application No. 2004-139123 filed on May 7, 2004.

BACKGROUND OF THE INVENTION

1. Field of the Invention

The present invention relates to an imaging objective lens suitable for a single-lens-reflex camera and an electric still camera and in particular to a large-aperture-ratio internal focusing telephoto lens.

2. Related Background Art

In a telephoto lens, optical performance tends to deteriorate so far with increasing longitudinal and lateral chromatic aberrations in accordance with extending the focal length or miniaturizing the optical system by shortening the total lens length. In Japanese Patent Application Laid-Open No. 6-201988, for example, it has been known that a focusing mechanism of a large-aperture-ratio internal focusing telephoto lens is small with securing optical performance by suppressing chromatic aberration such that a low dispersion positive lens having anomalous dispersion such as fluorite and a high dispersion negative lens are used in a front lens group where a paraxial ray height and an off-axial principal ray height passing thereof tend to become relatively high.

However, in a conventional large-aperture-ratio internal focusing telephoto lens, since the dimension of a focusing mechanism has to be still large, reduction of burden to a motor has not been sufficient. When a telephoto lens of this kind is made to be a vibration reduction lens, it causes problems that the diameters of a focusing lens group as well as a vibration reduction lens group become large and burden to the actuator becomes large.

SUMMARY OF THE INVENTION

The present invention is made in view of the aforementioned problems and has an object to provide a large-aperture-ratio internal focusing telephoto lens applicable to a wider photographing area by equipping a vibration reduction function capable to satisfactorily correct a camera shake and the like with securing superb optical performance.

According to a first aspect of the present invention, a large-aperture-ratio internal focusing telephoto lens includes, in order from an object, a first lens group having positive refractive power, a second lens group having negative refractive power, and a third lens group having positive refractive power. The second lens group is moved along an optical axis upon changing focus from infinity to a close-range object. The first lens group includes at least two cemented lenses.

In the first aspect of the present invention, it is preferable that either one of the cemented lens satisfies the following conditional expression (1):

$$20 < vp - vn \qquad (1)$$

where $vp$ denotes Abbe number of the positive lens element in the cemented lens, and $vn$ denotes Abbe number of the negative lens element in the cemented lens.

In the first aspect of the present invention, the first lens group preferably satisfies the following conditional expression (2):

$$0.4 < f1/f < 0.8 \qquad (2)$$

where $f$ denotes the focal length of the large-aperture-ratio internal focusing telephoto lens, and $f1$ denotes the focal length of the first lens group.

In the first aspect of the present invention, it is preferable that the first lens group includes at least four positive lens elements and at least two negative lens elements and the following conditional expression (3) is preferably satisfied:

$$2.7 < f1/(-f2) < 5 \qquad (3)$$

where $f2$ denotes the focal length of the second lens group G2.

In the first aspect of the present invention, it is preferable that the second lens group includes at least two negative lens elements and at least two positive lens elements and the following conditional expression (4) is preferably satisfied:

$$0.1 < (-f2)/f < 0.3 \qquad (4).$$

Other features and advantages according to the present invention will be readily under stood from the detailed description of the preferred embodiments in conjunction with the accompanying drawings.

BRIEF DESCRIPTION OF THE DRAWINGS

FIG. 4 is a diagram showing a sectional view of a large-aperture-ratio internal focusing telephoto lens according to Example 2 of the present invention.

FIG. 8A shows various aberrations of the large-aperture-ratio internal focusing telephoto lens according to Example 3 focusing at infinity and FIG. 8B shows coma of the large-aperture-ratio internal focusing telephoto lens according to Example 3 focusing at infinity upon vibration reduction.

FIG. 10 is a diagram showing a sectional view of a large-aperture-ratio internal focusing telephoto lens according to Example 4 of the present invention.

FIG. 11A shows various aberrations of the large-aperture-ratio internal focusing telephoto lens according to Example 4 focusing at infinity and FIG. 11B shows coma of the large-aperture-ratio internal focusing telephoto lens according to Example 4 focusing at infinity upon vibration reduction.

FIG. 13 is a diagram showing a sectional view of a large-aperture-ratio internal focusing telephoto lens according to Example 5 of the present invention.

DESCRIPTION OF THE PREFERRED EMBODIMENTS

Figure 1:
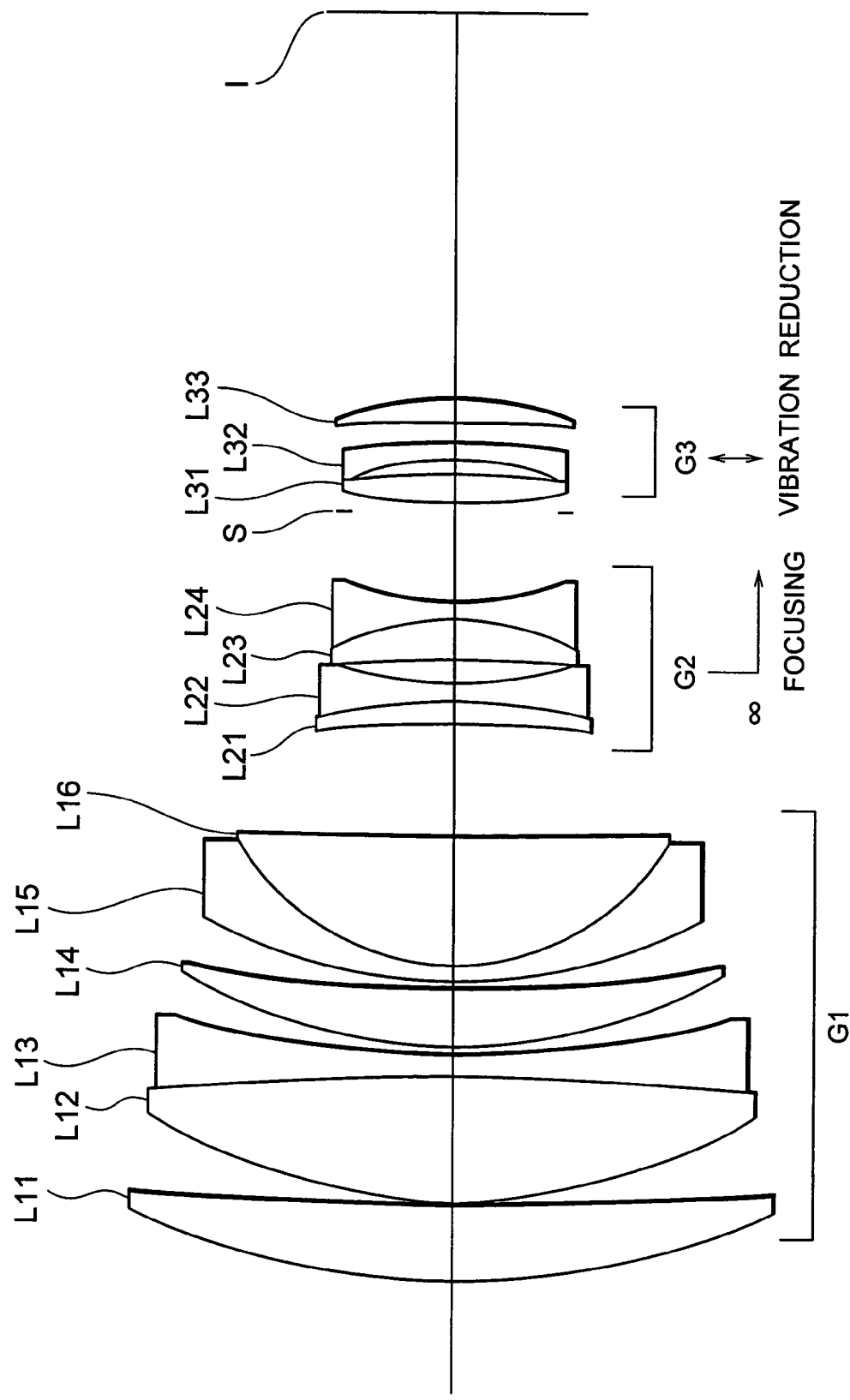
FIG. 1 is a diagram showing a sectional view of a large-aperture-ratio internal focusing telephoto lens according to Example 1 of the present invention.

A large-aperture-ratio internal focusing telephoto lens according to the present invention is explained below with reference to accompanying drawings.

The large-aperture-ratio internal focusing telephoto lens according to the present invention has a longer total lens length in comparison with an ordinary lens. Since the center of gravity of the lens comes considerably away from a camera, probability of causing camera shake, in particular, with hand-held shooting becomes high. In order to solve the problem, it is necessary to introduce a vibration reduction function that is carried out by moving a portion of the lens system perpendicularly to the optical axis.

In order to construct a vibration reduction mechanism with a simple construction, it is preferable that a first lens group G1 having positive refractive power and a second lens group G2 having negative refractive power, which carries out focusing, roughly form an afocal optical system and a third lens group G3, which is a master lens group, is used as a vibration reduction lens group.

In order to reduce burden to the motor for focusing and to the actuator for vibration reduction, it is necessary that the diameters of the second lens group and the third lens group are small.

In the large-aperture-ratio internal focusing telephoto lens according to the present invention, the f-number (FNO) of the whole optical system is substantially equal to that of the third lens group G3. Accordingly, spherical aberration has to be corrected at a height that is a ray height of a regular f-number in addition to a moving amount of the third lens group G3 perpendicular to the optical axis.

In order to construct the third lens group G3 with fewer lens elements such as a positive, a negative, and a positive lens elements, it is preferable that each lens element has high refractive index. Accordingly, g-line component of longitudinal chromatic aberration tends to be under-correction.

The first lens group G1 is considerably high speed having an f-number (FNO) of about 1.1 and spherical aberration becomes largely under-correction, so that it is preferable that production of high order spherical aberration is suppressed and spherical aberration of each line is made to be equal. Moreover, it is preferable that g-line component of longitudinal chromatic aberration is under-correction.

The second lens group G2 corrects spherical aberration and astigmatism produced by the first lens group G1 and chromatic aberration produced by the whole optical system.

The large-aperture-ratio internal focusing telephoto lens according to the present invention includes, in order from an object, a first lens group G1 having positive refractive power, a second lens group G2 having negative refractive power, and a third lens group G3 having positive refractive power. When the lens changes focus from infinity to a close-range object, the second lens group G2 is moved along the optical axis. The first lens group G1 includes at least two cemented lenses and either one of the cemented lens preferably satisfies the following conditional expression (1):

$$20 < \nu p - \nu n \qquad (1)$$

where νp denotes Abbe number of a positive lens element in the cemented lens in the first lens group G1, and νn denotes Abbe number of a negative lens element in the cemented lens in the first lens group G1.

The first lens group preferably satisfies the following conditional expression (2):

$$0.4 < f1/f < 0.8 \qquad (2)$$

where f denotes the focal length of the large-aperture-ratio internal focusing telephoto lens, and f1 denotes the focal length of the first lens group G1.

In the large-aperture-ratio internal focusing telephoto lens securing optical performance with keeping the total lens length short, it is preferable that refractive power of each lens element in the first lens group G1 having positive refractive power is strong. However, when each power is made to be strong, it becomes difficult to make spherical aberration to be small. In order to correct spherical aberration and chromatic aberration, it is necessary to include an lens element having negative refractive power. However, when the first lens group G1 has only one cemented lens, the radius of curvature of the cemented surface becomes small and high order spherical aberration is produced, so that it is preferable that the first lens group G1 has at least two cemented lenses. Although it is effective for correcting spherical aberration to separate the cemented surface locating along the optical axis away from the aperture stop, curvatures of the sagittal image plane and the meridional image plane become conspicuous on the periphery of the image, so that it is undesirable.

Conditional expression (1) defines an appropriate range of Abbe numbers of the cemented lens elements in the first lens group G1.

When the value vp−vn is equal to or falls below the lower limit of conditional expression (1), refractive power of the cemented surface as a divergent surface becomes strong and high order spherical aberration is produced, so that it is undesirable. In order to secure the effect of the present invention, it is preferable to set the lower limit of conditional expression (1) to 30.

Conditional expression (2) defines an appropriate range of the focal length of the first lens group G1.

When the ratio f1/f is equal to or falls below the lower limit of conditional expression (2), the focal length f1 of the first lens group G1 becomes short and high order spherical aberration is produced, so that it becomes difficult to suppress variation in spherical aberration upon changing focus from infinity to a close-range object.

On the other hand, when the ratio f1/f is equal to or exceeds the upper limit of conditional expression (2), the focal length f1 of the first lens group G1 becomes long and a moving amount of the second lens group G2 which is the focusing lens group becomes large, so that it becomes difficult to secure peripheral quantity of light.

In order to secure the effect of the present invention, it is preferable to set the upper limit of conditional expression (2) to 0.7 and the lower limit of conditional expression (2) to 0.5.

In the large-aperture-ratio internal focusing telephoto lens according to the present invention having the construction described above, the first lens group G1 includes at least four positive lens elements and at least two negative lens elements and the following conditional expression (3) is preferably satisfied:

$$2.7 < f1/(-f2) < 5 \qquad (3)$$

where f2 denotes the focal length of the second lens group G2.

Conditional expression (3) defines an appropriate range of the ratio of the focal length of the first lens group G1 to that of the second lens group G2.

When the ratio f1/(−f2) is equal to or falls below the lower limit of conditional expression (3), a distance between the first lens group G1 and the second lens group G2 becomes small and the diameters of the second lens group G2 and the third lens group G3 become large, so that it is undesirable to construct an autofocus or a vibration reduction mechanism.

On the other hand, when the ratio f1/(−f2) is equal to or exceeds the upper limit of conditional expression (3), the focal length of the second lens group G2 becomes short and the height of the on-axis bundle of ray passing through the second lens group G2 becomes low, so that spherical aberration produced in the first lens group G1 becomes difficult to be corrected by the second lens group G2. Moreover, a principal ray of the oblique incident rays also passes through the second lens group G2 at a low height, so that astigmatism made to be under-correction in the first lens group G1 becomes difficult to be corrected by the second lens group G2.

In order to secure the effect of the present invention, it is preferable to set the upper limit of conditional expression (3) to 3.5 and the lower limit of conditional expression (3) to 2.75.

In the large-aperture-ratio internal focusing telephoto lens according to the present invention, it is preferable that the second lens group G2 includes at least two negative lens elements and at least two positive lens elements and the following conditional expression (4) is preferably satisfied:

$$0.1 < (-f2)/f < 0.3 \qquad (4).$$

Conditional expression (4) defines an appropriate range of the focal length of the second lens group G2.

When the ratio (−f2)/f is equal to or falls below the lower limit of conditional expression (4), the focal length f2 of the second lens group G2 becomes short and the height of the principal ray of oblique incident rays passing through the most object side surface of the first lens group G1 becomes high, so that the diameter of the first lens group G1 becomes large. When a cemented surface is arranged in the second lens group G2 as shown in an example explained later, the radius of curvature of the cemented surface becomes small, so that spherical aberration becomes over-correction.

On the other hand, when the ratio (−f2)/f is equal to or exceeds the upper limit of conditional expression (4), the focal length f2 of the second lens group G2 becomes long, so that the diameter of the second lens group G2 becomes large and the diameter of the third lens group G3 also becomes large.

In order to secure the effect of the present invention, it is preferable to set the upper limit of conditional expression (4) to 0.25 and the lower limit of conditional expression (4) to 0.15.

Then, each example of the present invention is explained with reference to accompanying drawings.

EXAMPLE 1

FIG. 1 is a diagram showing a sectional view of a large-aperture-ratio internal focusing telephoto lens according to Example 1 of the present invention.

In FIG. 1, the large-aperture-ratio internal focusing telephoto lens is composed of, in order from an object, a first lens group G1 having positive refractive power, a second lens group G2 having negative refractive power, an aperture stop S, and a third lens group G3 having positive refractive power. The first lens group G1 is composed of, in order from the object, a positive meniscus lens L11 having a convex surface facing to the object, a cemented lens constructed by a double convex positive lens L12 cemented with a double concave negative lens L13, a positive meniscus lens L14 having a convex surface facing to the object, and a cemented lens constructed by a negative meniscus lens L15 having a convex surface facing to the object cemented with a positive meniscus lens L16 having a convex surface facing to the object. The second lens group G2 is composed of, in order from the object, a cemented lens constructed by a positive meniscus lens L21 having a concave surface facing to the object cemented with a double concave negative lens L22, and a cemented lens constructed by a positive meniscus lens L23 having a concave surface facing to the object cemented with a double concave negative lens L24. The third lens group G3 is composed of, a double convex positive lens L31, a negative meniscus lens L32 having a concave surface facing to the object, and a positive meniscus lens L33 having a concave surface facing to the object.

Upon changing focus from infinity to a close-range object, the second lens group G2 is moved along the optical axis. Upon carrying out vibration reduction, the third lens group G3 is moved perpendicularly to the optical axis as a whole so as to correct image blur on the image plane I.

Various values associated with Example 1 are listed in Table 1. In [Specifications], f denotes the focal length, FNO denotes the f-number, and 2ω denotes an angle of view (°). In [Lens Data], the first column shows the lens surface number counted in order from the object side, the second column "r"

shows a radius of curvature of the lens surface, the third column "d" shows a distance between adjacent lens surfaces, the fourth column "vd" shows Abbe number of the medium at d-line (λ=587.6 nm), the fifth column "nd" shows refractive index of the medium at d-line, and the sixth column "ng" shows refractive index of the medium at g-line (λ=435.8 nm). In the second column "r", "∞" denotes a plane surface. In the fifth column "nd" and the sixth column "ng", refractive index of the air 1.000000 is omitted. In [Variable Distances], the focal length f or the shooting magnification β, and the variable distances are shown. B.f. denotes the back focal length.

In [Values for Conditional Expressions], values for respective conditional expressions are shown.

In the tables for various values, "mm" is generally used for the unit of length such as the focal length, the radius of curvature, and the distance between optical surfaces. However, since an optical system proportionally enlarged or reduced its dimension can be obtained similar optical performance, the unit is not necessary to be limited to "mm" and any other suitable unit can be used.

The explanation of reference symbols is the same in the other examples, so that duplicated explanations are omitted.

TABLE 1

[Specifications]

| f = | 195.000 |
|---|---|
| FNO = | 2.0 |
| 2ω = | 12.59° |

[Lens Data]

| | r | d | vd | nd | ng |
|---|---|---|---|---|---|
| 1) | 127.7528 | 13.00 | 82.5 | 1.49782 | 1.50527 |
| 2) | 611.7092 | 0.30 | | | |
| 3) | 95.4761 | 21.00 | 82.6 | 1.49782 | 1.50526 |
| 4) | −551.5251 | 4.00 | 51.1 | 1.73350 | 1.75140 |
| 5) | 172.3337 | 1.00 | | | |
| 6) | 85.7595 | 10.00 | 82.5 | 1.49782 | 1.50527 |
| 7) | 227.7262 | 1.00 | | | |
| 8) | 84.0750 | 3.00 | 49.5 | 1.77279 | 1.79232 |
| 9) | 40.7485 | 22.00 | 82.5 | 1.49782 | 1.50527 |
| 10) | 718.7147 | (d1) | | | |
| 11) | −280.3560 | 4.00 | 33.9 | 1.80384 | 1.83464 |
| 12) | −88.3062 | 3.00 | 57.5 | 1.67025 | 1.68468 |
| 13) | 65.1793 | 4.00 | | | |
| 14) | −240.8586 | 7.00 | 43.4 | 1.84042 | 1.86492 |
| 15) | −40.6610 | 3.00 | 60.1 | 1.64000 | 1.65311 |
| 16) | 48.0239 | (d2) | | | |
| 17) | ∞ | 1.20 | | Aperture Stop S | |
| 18) | 87.9799 | 5.00 | 52.3 | 1.74810 | 1.76589 |
| 19) | −135.7440 | 2.60 | | | |
| 20) | −45.0000 | 3.00 | 28.6 | 1.79504 | 1.83152 |
| 21) | −107.1007 | 3.00 | | | |
| 22) | −362.7077 | 4.50 | 57.5 | 1.67025 | 1.68468 |
| 23) | −52.8708 | B.f. | | | |

[Variable Distances]

| | Infinity | | Closest shooting distance |
|---|---|---|---|
| f = | 195.0000 | β = | −0.1239 |
| d1 = | 19.0000 | | 26.8726 |
| d2 = | 15.5410 | | 7.6684 |
| B.f. = | 64.7048 | | 64.7583 |

[Values for Conditional Expressions]

| νp − νn = | 33.07 |
|---|---|
| f1/f = | 0.57 |
| f1/(−f2) = | 2.79 |
| (−f2)/f = | 0.20 |

Figure 2A:
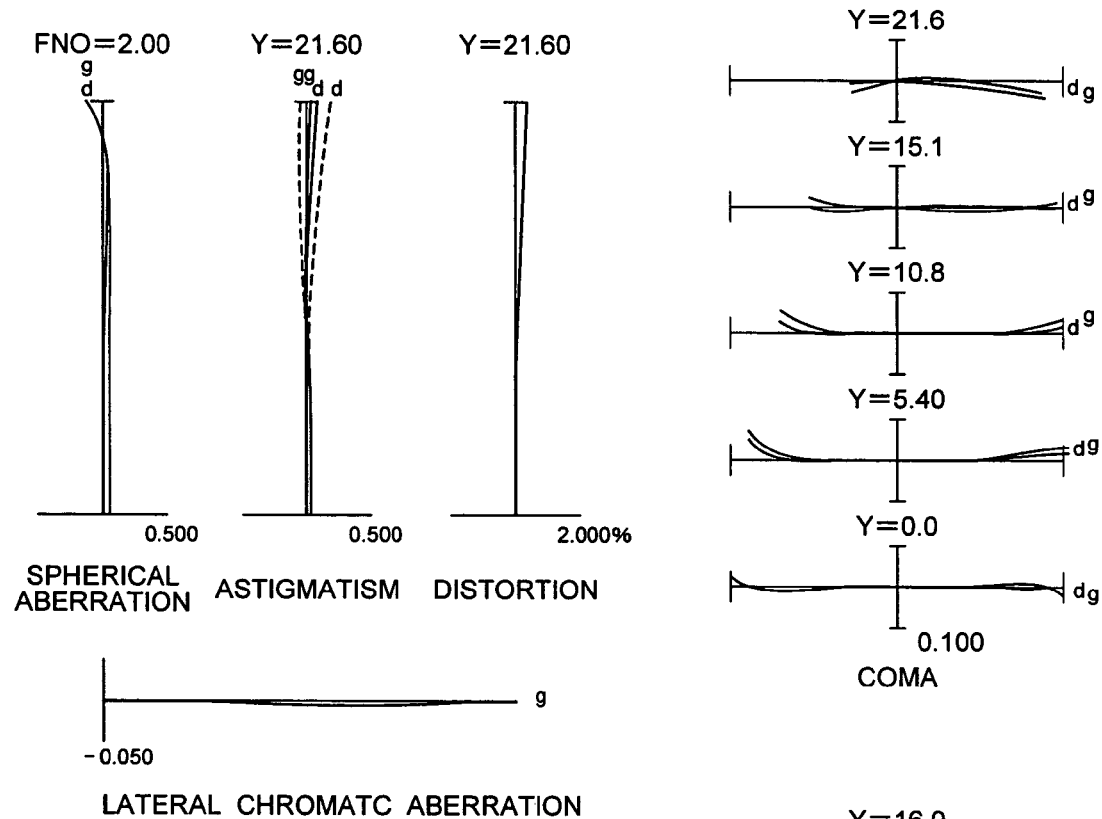
FIG. 2A shows various aberrations of the large-aperture-ratio internal focusing telephoto lens according to Example 1 focusing at infinity and FIG. 2B shows coma of the large-aperture-ratio internal focusing telephoto lens according to Example 1 focusing at infinity upon vibration reduction.
Figure 2B:
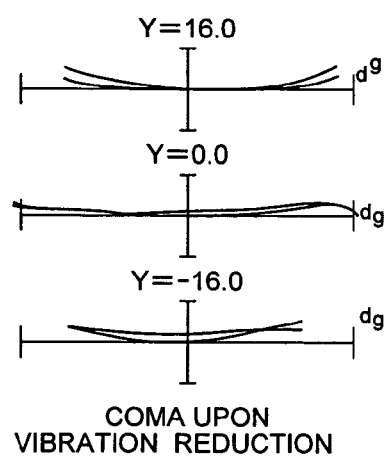
Figures 3A, 3B:
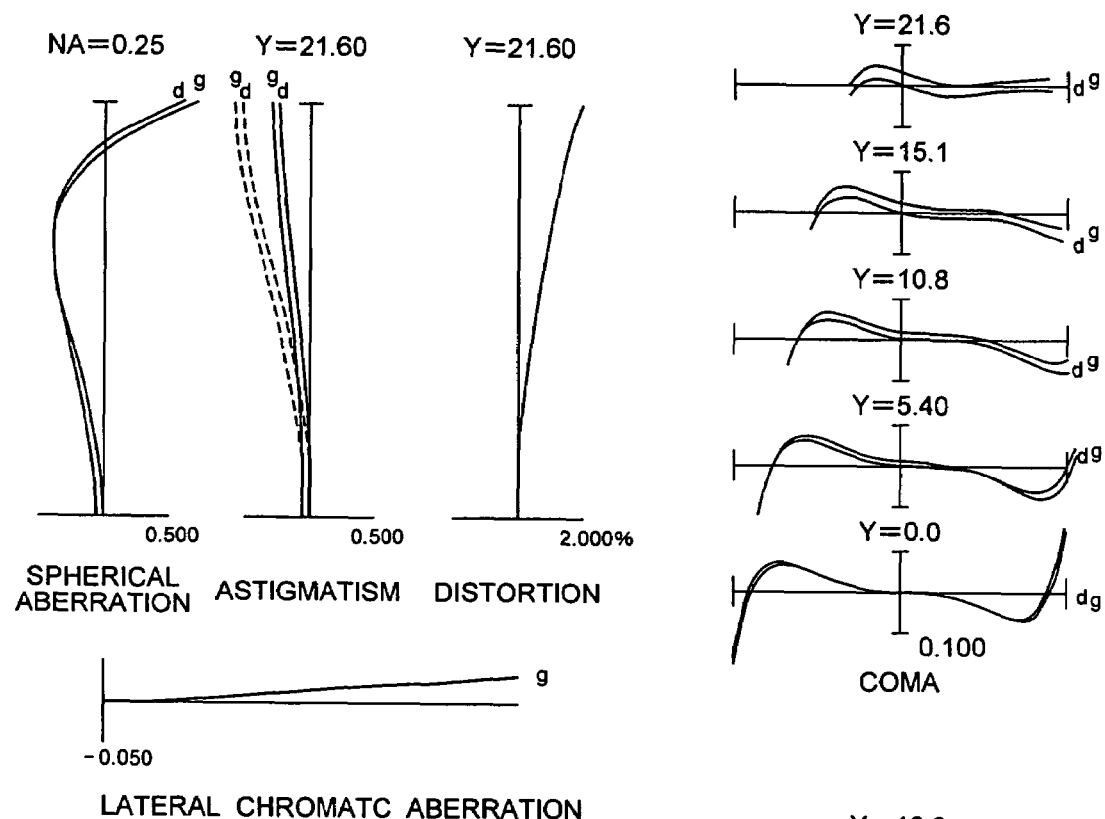
FIG. 3A shows various aberrations of the large-aperture-ratio internal focusing telephoto lens according to Example 1 focusing at a closest shooting distance and FIG. 3B shows coma of the large-aperture-ratio internal focusing telephoto lens according to Example 1 focusing at a closest shooting distance upon vibration reduction.

FIG. 2A shows various aberrations of the large-aperture-ratio internal focusing telephoto lens according to Example 1 focusing at infinity. FIG. 2B shows coma of the large-aperture-ratio internal focusing telephoto lens according to Example 1 focusing at infinity upon vibration reduction. FIG. 3A shows various aberrations of the large-aperture-ratio internal focusing telephoto lens according to Example 1 focusing at a closest shooting distance. FIG. 3B shows coma of the large-aperture-ratio internal focusing telephoto lens according to Example 1 focusing at a closest shooting distance upon vibration reduction.

In respective graphs, FNO denotes the f-number, NA denotes the numerical aperture, Y denotes an image height, d denotes d-line (λ=587.6 nm), and g denotes g-line (λ=435.8 nm). In graphs showing astigmatism, a solid line indicates a sagittal image plane, and a broken line indicates a meridional image plane. In the following Examples, the same reference symbols as Example 1 are used, so that duplicated explanations are omitted.

As is apparent from respective graphs, the large-aperture-ratio internal focusing telephoto lens according to Example 1 shows superb optical performance correcting various aberrations.

EXAMPLE 2

FIG. 4 is a diagram showing a sectional view of a large-aperture-ratio internal focusing telephoto lens according to Example 2 of the present invention.

In FIG. 4, the large-aperture-ratio internal focusing telephoto lens is composed of, in order from an object, a first lens group G1 having positive refractive power, a second lens group G2 having negative refractive power, an aperture stop S, and a third lens group G3 having positive refractive power. The first lens group G1 is composed of, in order from the object, a double convex positive lens L11, a cemented lens constructed by a double convex positive lens L12 cemented with a double concave negative lens L13, and a cemented lens constructed by a positive meniscus lens L14 having a convex surface facing to the object, a negative meniscus lens L15 having a convex surface facing to the object, and a positive meniscus lens L16 having a convex surface facing to the object. The second lens group G2 is composed of, in order from the object, a double concave negative lens L21, and a cemented lens constructed by a positive meniscus lens L22 having a concave surface facing to the object cemented with a double concave negative lens L23. The third lens group G3 is composed of, in order from the object, a double convex positive lens L31, a negative meniscus lens L32 having a concave surface facing to the object, and a positive meniscus lens L33 having a concave surface facing to the object.

Upon changing focus from infinity to a close-range object, the second lens group G2 is moved along the optical axis. Upon carrying out vibration reduction, the third lens group G3 is moved perpendicularly to the optical axis as a whole so as to correct image blur on the image plane I.

Various values associated with Example 2 are listed in Table 2.

TABLE 2

[Specifications]

| f = | 195.000 |
|---|---|
| FNO = | 1.84 |
| 2ω = | 12.54° |

TABLE 2-continued

[Lens Data]

|  | r | d | vd | nd | ng |
|---|---|---|---|---|---|
| 1) | 106.026 | 18.00 | 82.6 | 1.49782 | 1.50526 |
| 2) | −4696.044 | 0.30 |  |  |  |
| 3) | 87.036 | 22.00 | 82.6 | 1.49782 | 1.50526 |
| 4) | −431.253 | 4.00 | 55.6 | 1.69680 | 1.71232 |
| 5) | 201.047 | 1.00 |  |  |  |
| 6) | 73.272 | 11.00 | 82.6 | 1.49782 | 1.50526 |
| 7) | 172.530 | 3.00 | 47.5 | 1.78797 | 1.80879 |
| 8) | 39.020 | 18.50 | 82.6 | 1.49782 | 1.50526 |
| 9) | 426.343 | (d1) |  |  |  |
| 10) | −200.000 | 3.00 | 70.5 | 1.48749 | 1.49593 |
| 11) | 56.795 | 5.20 |  |  |  |
| 12) | −280.501 | 8.00 | 33.9 | 1.80384 | 1.83464 |
| 13) | −36.564 | 3.00 | 60.1 | 1.64000 | 1.65311 |
| 14) | 49.573 | (d2) |  |  |  |
| 15) | ∞ | 1.20 |  | Aperture Stop S |  |
| 16) | 105.103 | 5.00 | 52.3 | 1.74810 | 1.76589 |
| 17) | −85.683 | 2.50 |  |  |  |
| 18) | −40.904 | 3.00 | 25.4 | 1.80518 | 1.84731 |
| 19) | −92.849 | 7.00 |  |  |  |
| 20) | −316.419 | 5.00 | 60.0 | 1.64000 | 1.65313 |
| 21) | −48.897 | B.f. |  |  |  |

[Variable Distances]

|  | Infinity | Closest shooting distance |
|---|---|---|
| f = | 195.0000 | β = −0.1260 |
| d1 = | 19.0000 | 29.0970 |
| d2 = | 14.9728 | 4.8758 |
| B.f. = | 58.7810 | 58.8254 |

[Values for Conditional Expressions]

νp − νn = 35.1
f1/f = 0.64
f1/(−f2) = 2.98
(−f2)/f = 0.22

Figure 5A:
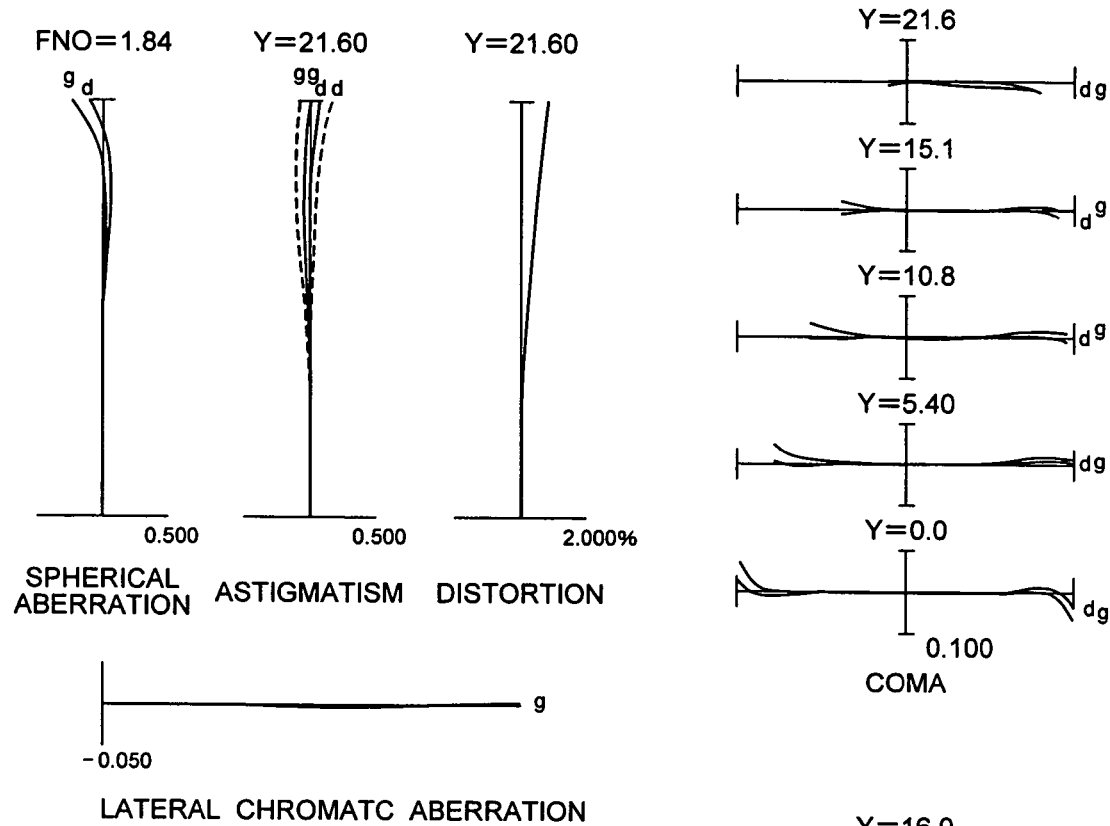
FIG. 5A shows various aberrations of the large-aperture-ratio internal focusing telephoto lens according to Example 2 focusing at infinity and FIG. 5B shows coma of the large-aperture-ratio internal focusing telephoto lens according to Example 2 focusing at infinity upon vibration reduction.
Figure 5B:
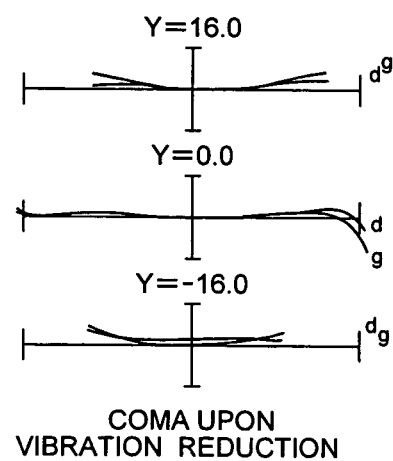
Figure 6A:
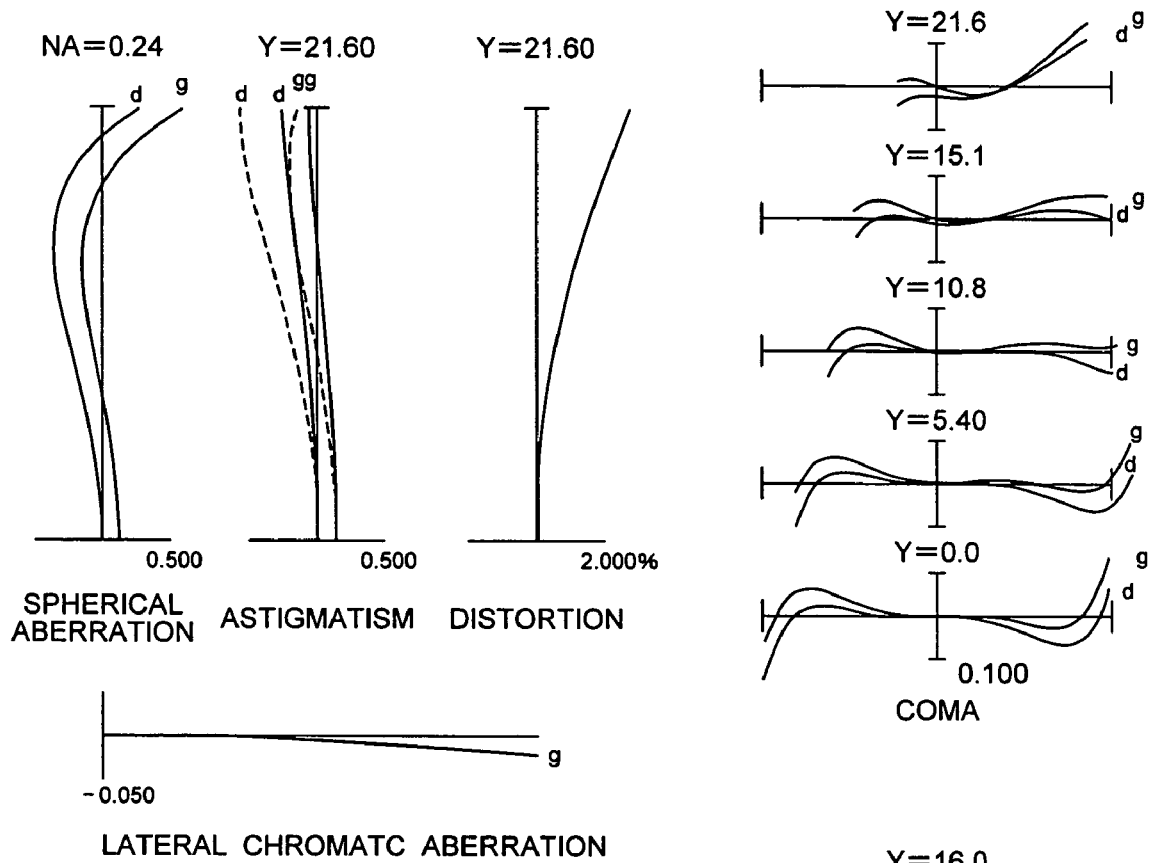
FIG. 6A shows various aberrations of the large-aperture-ratio internal focusing telephoto lens according to Example 2 focusing at a closest shooting distance and FIG. 6B shows coma of the large-aperture-ratio internal focusing telephoto lens according to Example 2 focusing at a closest shooting distance upon vibration reduction.
Figure 6B:
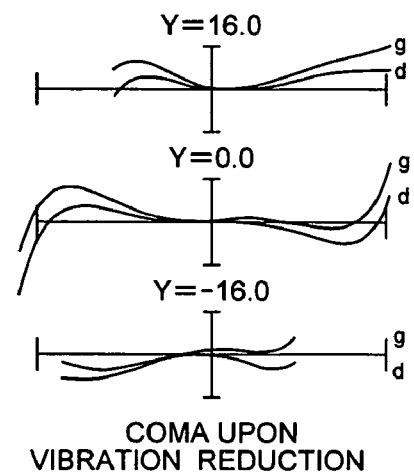

FIG. 5A shows various aberrations of the large-aperture-ratio internal focusing telephoto lens according to Example 2 focusing at infinity. FIG. 5B shows coma of the large-aperture-ratio internal focusing telephoto lens according to Example 2 focusing at infinity upon vibration reduction. FIG. 6A shows various aberrations of the large-aperture-ratio internal focusing telephoto lens according to Example 2 focusing at a closest shooting distance. FIG. 6B shows coma of the large-aperture-ratio internal focusing telephoto lens according to Example 2 focusing at a closest shooting distance upon vibration reduction.

As is apparent from respective graphs, the large-aperture-ratio internal focusing telephoto lens according to Example 2 shows superb optical performance correcting various aberrations.

EXAMPLE 3

Figure 7:
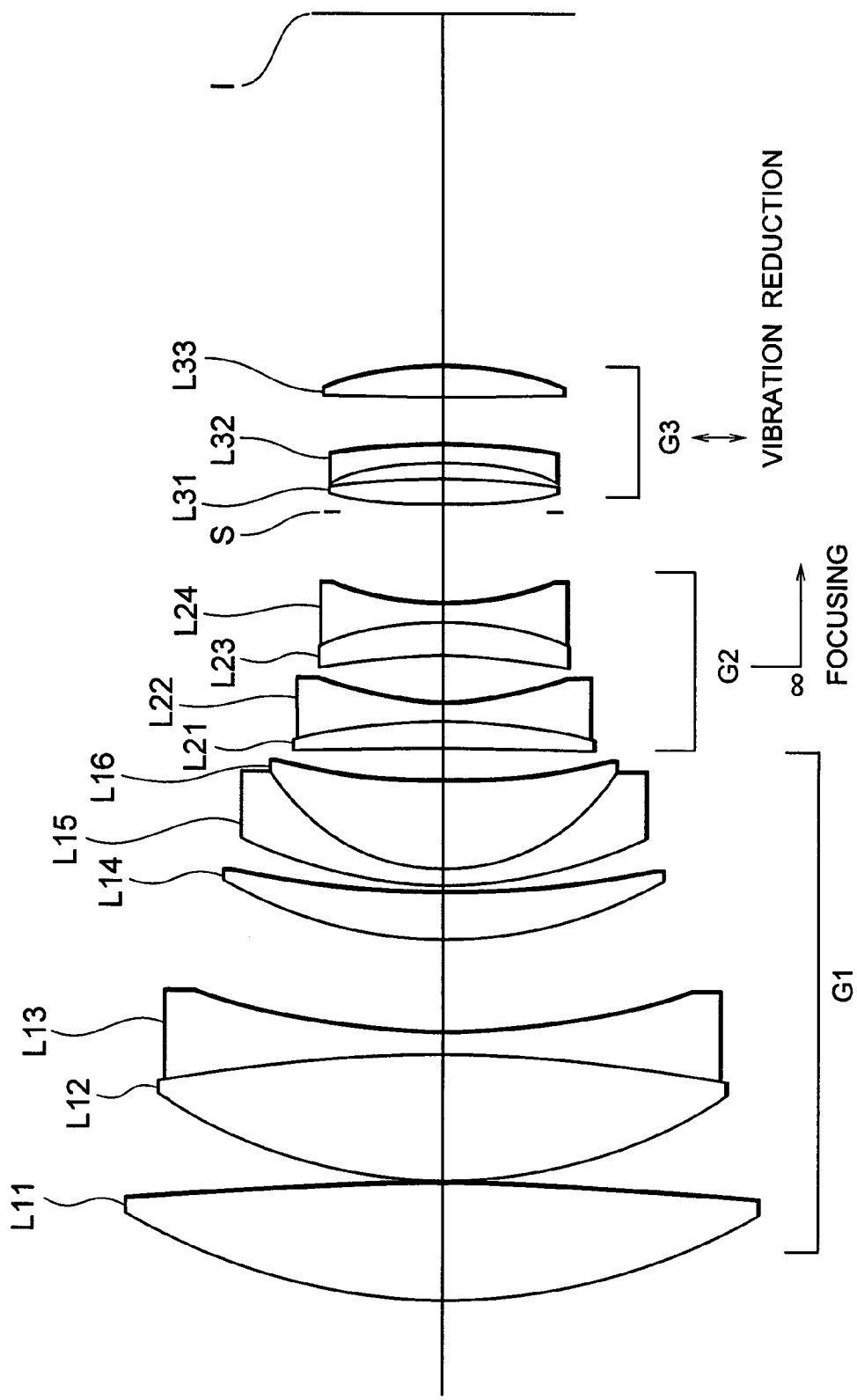
FIG. 7 is a diagram showing a sectional view of a large-aperture-ratio internal focusing telephoto lens according to Example 3 of the present invention.

FIG. 7 is a diagram showing a sectional view of a large-aperture-ratio internal focusing telephoto lens according to Example 3 of the present invention.

In FIG. 7, the large-aperture-ratio internal focusing telephoto lens is composed of, in order from an object, a first lens group G1 having positive refractive power, a second lens group G2 having negative refractive power, an aperture stop S, and a third lens group G3 having positive refractive power. The first lens group G1 is composed of, in order from the object, a double convex positive lens L11, a cemented lens constructed by a double convex positive lens L12 cemented by a double concave negative lens L13, a positive meniscus lens L14 having a convex surface facing to the object, and a cemented lens constructed by a negative meniscus lens L15 having a convex surface facing to the object cemented with a positive meniscus lens L16 having a convex surface facing to the object. The second lens group G2 is composed of, in order from the object, a cemented lens constructed by a positive meniscus lens L21 having a concave surface facing to the object cemented with a double concave negative lens L22, and a cemented lens constructed by a positive meniscus lens L23 having a concave surface facing to the object cemented with a double concave negative lens L24. The third lens group G3 is composed of, in order from the object, a double convex positive lens L31, a negative meniscus lens L32 having a concave surface facing to the object, and a double convex positive lens L33.

Upon changing focus from infinity to a close-range object, the second lens group G2 is moved along the optical axis. Upon carrying out vibration reduction, the third lens group G3 is moved perpendicularly to the optical axis as a whole so as to correct image blur on the image plane I.

Various values associated with Example 3 are listed in Table 3.

TABLE 3

[Specifications]

f = 195.000
FNO = 1.84
2ω = 12.62°

[Lens Data]

|  | r | d | vd | nd | ng |
|---|---|---|---|---|---|
| 1) | 104.204 | 20.00 | 82.6 | 1.49782 | 1.50526 |
| 2) | −630.890 | 0.30 |  |  |  |
| 3) | 88.701 | 21.00 | 82.6 | 1.49782 | 1.50526 |
| 4) | −270.095 | 4.00 | 52.3 | 1.74810 | 1.76589 |
| 5) | 128.345 | 15.39 |  |  |  |
| 6) | 71.441 | 8.00 | 91.0 | 1.44679 | 1.45282 |
| 7) | 174.320 | 1.00 |  |  |  |
| 8) | 74.005 | 3.00 | 52.3 | 1.74810 | 1.76589 |
| 9) | 34.121 | 15.00 | 82.6 | 1.49782 | 1.50526 |
| 10) | 126.546 | (d1) |  |  |  |
| 11) | −957.711 | 4.80 | 39.6 | 1.80454 | 1.83050 |
| 12) | −100.138 | 3.00 | 54.6 | 1.51454 | 1.52632 |
| 13) | 55.554 | 8.00 |  |  |  |
| 14) | −109.151 | 6.00 | 33.9 | 1.80384 | 1.83464 |
| 15) | −51.923 | 3.00 | 57.0 | 1.62280 | 1.63639 |
| 16) | 54.980 | (d2) |  |  |  |
| 17) | ∞ | 1.20 |  | Aperture Stop S |  |
| 18) | 111.154 | 4.50 | 52.3 | 1.74810 | 1.76589 |
| 19) | −121.699 | 2.70 |  |  |  |
| 20) | −49.128 | 3.00 | 28.5 | 1.72825 | 1.76200 |
| 21) | −104.898 | 8.00 |  |  |  |
| 22) | 413.276 | 5.00 | 60.1 | 1.64000 | 1.65311 |
| 23) | −69.215 | B.f. |  |  |  |

[Variable Distances]

|  | Infinity | Closest shooting distance |
|---|---|---|
| f = | 195.0000 | β = −0.1258 |
| d1 = | 5.5000 | 15.0995 |
| d2 = | 15.5239 | 5.9244 |
| B.f. = | 59.4575 | 59.4386 |

[Values for Conditional Expressions]

νp − νn = 30.26
f1/f = 0.62
f1/(−f2) = 2.91
(−f2)/f = 0.21

Figure 9A:
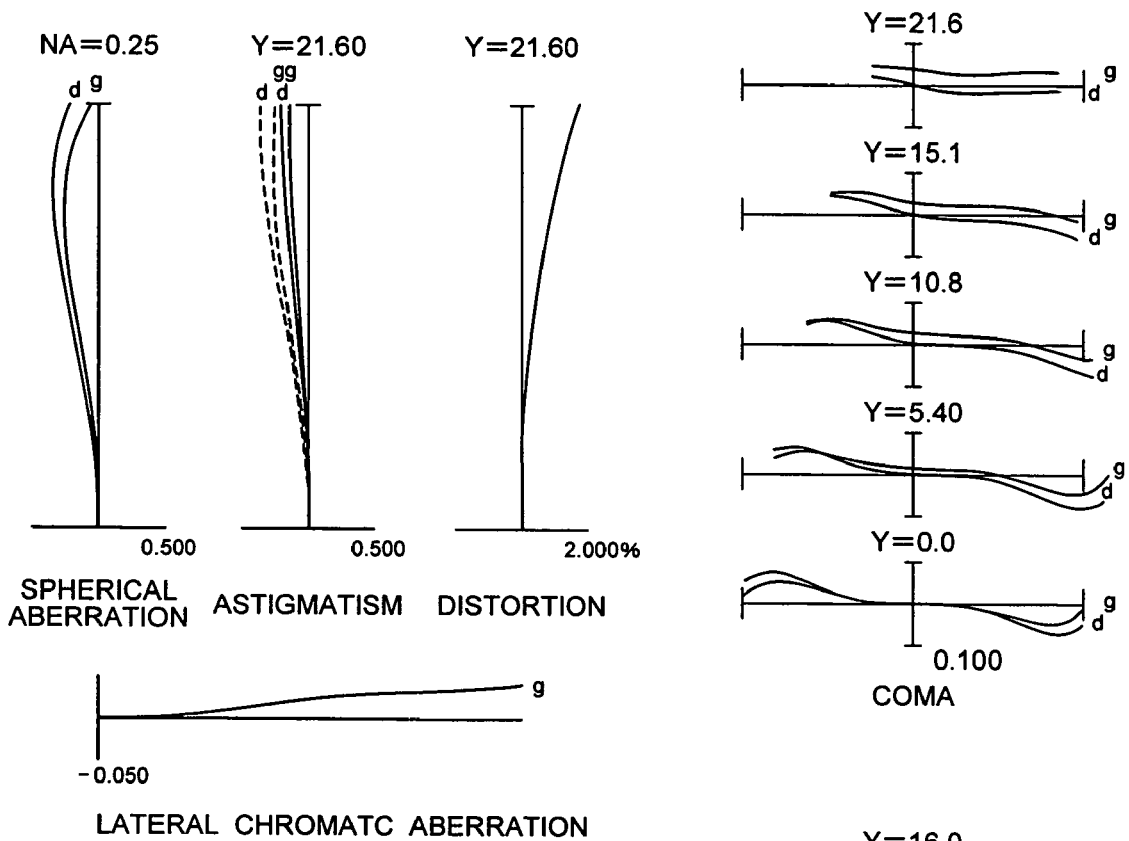
FIG. 9A shows various aberrations of the large-aperture-ratio internal focusing telephoto lens according to Example 3 focusing at a closest shooting distance and FIG. 9B shows coma of the large-aperture-ratio internal focusing telephoto lens according to Example 3 focusing at a closest shooting distance upon vibration reduction.
Figure 9B:
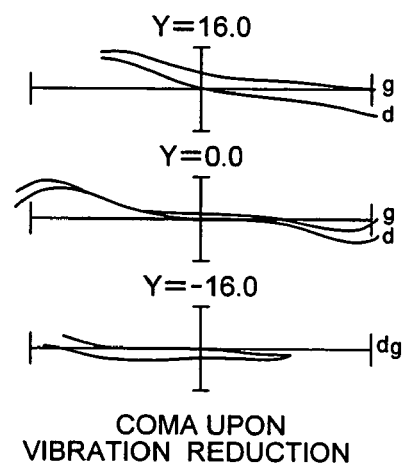

FIG. 8A shows various aberrations of the large-aperture-ratio internal focusing telephoto lens according to Example 3 focusing at infinity. FIG. 8B shows coma of the large-aperture-ratio internal focusing telephoto lens according to Example 3 focusing at infinity upon vibration reduction. FIG. 9A shows various aberrations of the large-aperture-ratio internal focusing telephoto lens according to Example 3 focusing at a closest shooting distance. FIG. 9B shows coma of the large-aperture-ratio internal focusing telephoto lens according to Example 3 focusing at a closest shooting distance upon vibration reduction.

As is apparent from respective graphs, the large-aperture-ratio internal focusing telephoto lens according to Example 3 shows superb optical performance correcting various aberrations.

EXAMPLE 4

FIG. 10 is a diagram showing a sectional view of a large-aperture-ratio internal focusing telephoto lens according to Example 4 of the present invention.

In FIG. 10, the large-aperture-ratio internal focusing telephoto lens is composed of, in order from an object, a first lens group G1 having positive refractive power, a second lens group G2 having negative refractive power, an aperture stop S, and a third lens group G3 having positive refractive power. The first lens group G1 is composed of, in order from the object, a positive meniscus lens L11 having a convex surface facing to the object, a positive meniscus lens L12 having a convex surface facing to the object, a cemented lens constructed by a double convex positive lens L13 cemented with a double concave negative lens L14, and a cemented lens constructed by a negative meniscus lens L15 having a convex surface facing to the object cemented with a positive meniscus lens L16 having a convex surface facing to the object. The second lens group G2 is composed of, in order from the object, a negative meniscus lens L21 having a convex surface facing to the object, and a cemented lens constructed by a positive meniscus lens L22 having a concave surface facing to the object cemented with a double concave negative lens L23. The third lens group G3 is composed of, in order from the object, a double convex positive lens L31, a negative meniscus lens L32 having a concave surface facing to the object, and a double convex positive lens L33.

Upon changing focus from infinity to a close-range object, the second lens group G2 is moved along the optical axis. Upon carrying out vibration reduction, the third lens group G3 is moved perpendicularly to the optical axis as a whole so as to correct image blur on the image plane I.

Various values associated with Example 4 are listed in Table 4.

TABLE 4

[Specifications]

| | |
|---|---|
| f = | 195.000 |
| FNO = | 1.84 |
| 2ω = | 12.62° |

[Lens Data]

| | r | d | vd | nd | ng |
|---|---|---|---|---|---|
| 1) | 112.373 | 14.00 | 91.0 | 1.44679 | 1.45282 |
| 2) | 634.973 | 0.30 | | | |
| 3) | 100.557 | 18.00 | 91.0 | 1.44679 | 1.45282 |
| 4) | 2343.087 | 0.30 | | | |
| 5) | 84.180 | 17.00 | 91.0 | 1.44679 | 1.45282 |

TABLE 4-continued

| | r | d | vd | nd | ng |
|---|---|---|---|---|---|
| 6) | −509.858 | 4.00 | 50.2 | 1.72000 | 1.73797 |
| 7) | 123.040 | 16.59 | | | |
| 8) | 62.303 | 3.00 | 45.0 | 1.74400 | 1.76487 |
| 9) | 32.700 | 16.00 | 82.5 | 1.49782 | 1.50527 |
| 10) | 114.570 | (d1) | | | |
| 11) | 492.130 | 3.00 | 70.0 | 1.51860 | 1.52767 |
| 12) | 39.547 | 9.00 | | | |
| 13) | −129.752 | 6.00 | 39.6 | 1.80454 | 1.83050 |
| 14) | −38.250 | 3.00 | 55.6 | 1.69680 | 1.71232 |
| 15) | 88.691 | (d2) | | | |
| 16) | ∞ | 1.20 | | Aperture Stop S | |
| 17) | 154.926 | 4.20 | 55.6 | 1.69680 | 1.71232 |
| 18) | −121.580 | 2.40 | | | |
| 19) | −52.065 | 3.00 | 31.6 | 1.75692 | 1.78801 |
| 20) | −89.553 | 5.00 | | | |
| 21) | 141.244 | 5.40 | 60.0 | 1.64000 | 1.65313 |
| 22) | −87.541 | B.f. | | | |

[Variable Distances]

| | Infinity | | Closest shooting distance |
|---|---|---|---|
| f = | 195.0000 | β = | −0.1255 |
| d1 = | 5.1000 | | 14.3665 |
| d2 = | 10.4923 | | 1.2258 |
| B.f. = | 59.8526 | | 59.8821 |

[Values for Conditional Expressions]

| | |
|---|---|
| νp − νn = | 37.52 |
| f1/f = | 0.61 |
| f1/(−f2) = | 3.0 |
| (−f2)/f = | 0.20 |

Figure 12A:
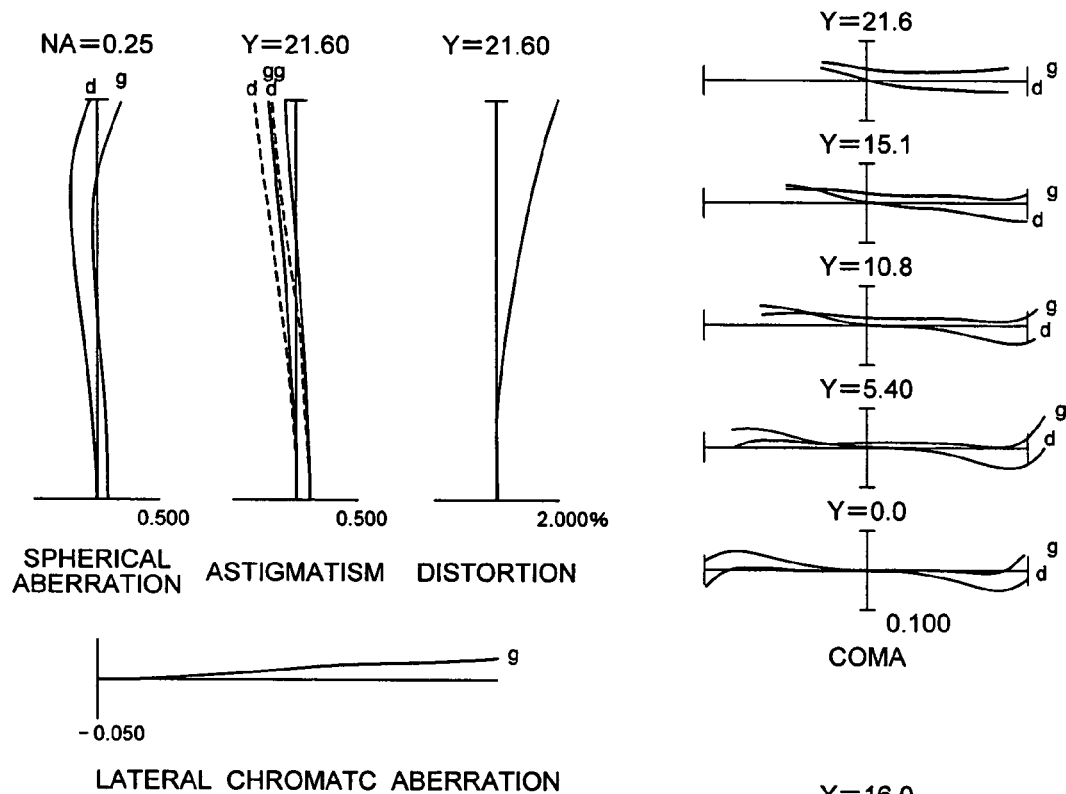
FIG. 12A shows various aberrations of the large-aperture-ratio internal focusing telephoto lens according to Example 4 focusing at a closest shooting distance and FIG. 12B shows coma of the large-aperture-ratio internal focusing telephoto lens according to Example 4 focusing at a closest shooting distance upon vibration reduction.
Figure 12B:
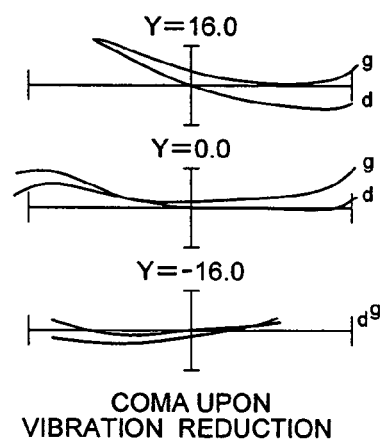

FIG. 11A shows various aberrations of the large-aperture-ratio internal focusing telephoto lens according to Example 4 focusing at infinity. FIG. 11B shows coma of the large-aperture-ratio internal focusing telephoto lens according to Example 4 focusing at infinity upon vibration reduction. FIG. 12A shows various aberrations of the large-aperture-ratio internal focusing telephoto lens according to Example 4 focusing at a closest shooting distance. FIG. 12B shows coma of the large-aperture-ratio internal focusing telephoto lens according to Example 4 focusing at a closest shooting distance upon vibration reduction.

As is apparent from respective graphs, the large-aperture-ratio internal focusing telephoto lens according to Example 4 shows superb optical performance correcting various aberrations.

EXAMPLE 5

FIG. 13 is a diagram showing a sectional view of a large-aperture-ratio internal focusing telephoto lens according to Example 5 of the present invention.

In FIG. 13, the large-aperture-ratio internal focusing telephoto lens is composed of, in order from an object, a first lens group G1 having positive refractive power, a second lens group G2 having negative refractive power, an aperture stop S, and a third lens group G3 having positive refractive power. The first lens group G1 is composed of, in order from the object, a double convex positive lens L11, a cemented lens constructed by a double convex positive lens L12 cemented with a double concave negative lens L13, a positive meniscus lens L14 having a convex surface facing to the object, and a cemented lens constructed by a negative meniscus lens L15 having a convex surface facing to the object cemented with a positive meniscus lens L16 having a convex surface facing to the object. The second lens group G2 is composed of, in order from the object, a cemented lens constructed by a double convex positive lens L21 cemented with a double concave negative lens L22, and a cemented lens constructed by a positive meniscus lens L23 having a concave surface facing to the object cemented with a double concave negative lens L24. The third lens group G3 is composed of, in order from the object, a double convex positive lens L31, a negative meniscus lens L32 having a concave surface facing to the object, and a double convex positive lens L33.

Upon changing focus from infinity to a close-range object, the second lens group G2 is moved along the optical axis. Upon carrying out vibration reduction, the third lens group G3 is moved perpendicularly to the optical axis as a whole so as to correct image blur on the image plane I.

Various values associated with Example 5 are listed in Table 5.

TABLE 5

[Specifications]

| | | |
|---|---|---|
| f = | | 195.000 |
| FNO = | | 1.84 |
| 2ω = | | 12.62° |

[Lens Data]

| | r | d | νd | nd | ng |
|---|---|---|---|---|---|
| 1) | 149.264 | 14.50 | 91.0 | 1.44679 | 1.45282 |
| 2) | −521.402 | 0.30 | | | |
| 3) | 100.946 | 19.00 | 82.5 | 1.49782 | 1.50527 |
| 4) | −521.111 | 4.00 | 46.5 | 1.80411 | 1.82581 |
| 5) | 206.174 | 0.30 | | | |
| 6) | 75.000 | 13.00 | 91.0 | 1.44679 | 1.45282 |
| 7) | 224.616 | 20.50 | | | |
| 8) | 78.529 | 3.00 | 52.3 | 1.74810 | 1.76589 |
| 9) | 34.031 | 16.00 | 82.5 | 1.49782 | 1.50527 |
| 10) | 157.980 | (d1) | | | |
| 11) | 1149.808 | 5.50 | 50.8 | 1.65844 | 1.67474 |
| 12) | −93.571 | 3.00 | 70.4 | 1.48749 | 1.49593 |
| 13) | 46.808 | 8.00 | | | |
| 14) | −106.788 | 4.00 | 25.4 | 1.80518 | 1.84731 |
| 15) | −63.094 | 2.50 | 54.0 | 1.61720 | 1.63149 |
| 16) | 55.618 | (d2) | | | |
| 17) | ∞ | 1.20 | | Aperture Stop S | |
| 18) | 105.988 | 5.00 | 55.6 | 1.69680 | 1.71232 |
| 19) | −99.126 | 2.50 | | | |
| 20) | −53.922 | 3.00 | 31.6 | 1.75692 | 1.78801 |
| 21) | −149.832 | 5.00 | | | |
| 22) | 214.832 | 5.00 | 60.0 | 1.64000 | 1.65313 |
| 23) | −74.855 | B.f. | | | |

[Variable Distances]

| | Infinity | | Closest shooting distance |
|---|---|---|---|
| f = | 195.0000 | β = | −0.1240 |
| d1 = | 2.2542 | | 11.4112 |
| d2 = | 14.6713 | | 5.5143 |
| B.f. = | 58.3952 | | 58.6727 |

[Values for Conditional Expressions]

| | |
|---|---|
| νp − νn = | 30.22 |
| f1/f = | 0.61 |
| f1/(−f2) = | 3.0 |
| (−f2)/f = | 0.20 |

Figure 14A:
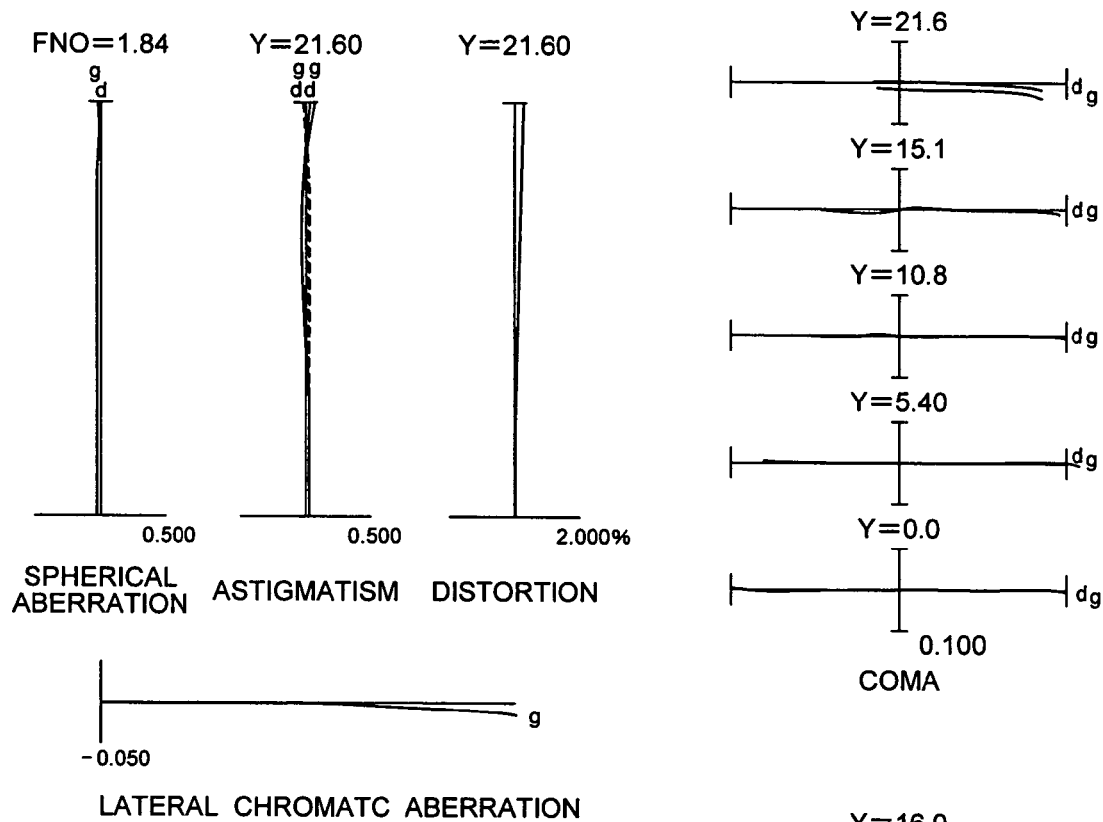
FIG. 14A shows various aberrations of the large-aperture-ratio internal focusing telephoto lens according to Example 5 focusing at infinity and FIG. 14B shows coma of the large-aperture-ratio internal focusing telephoto lens according to Example 5 focusing at infinity upon vibration reduction.
Figure 14B:
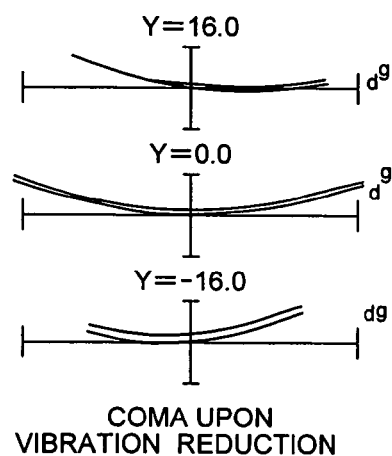
Figures 15A, 15B:
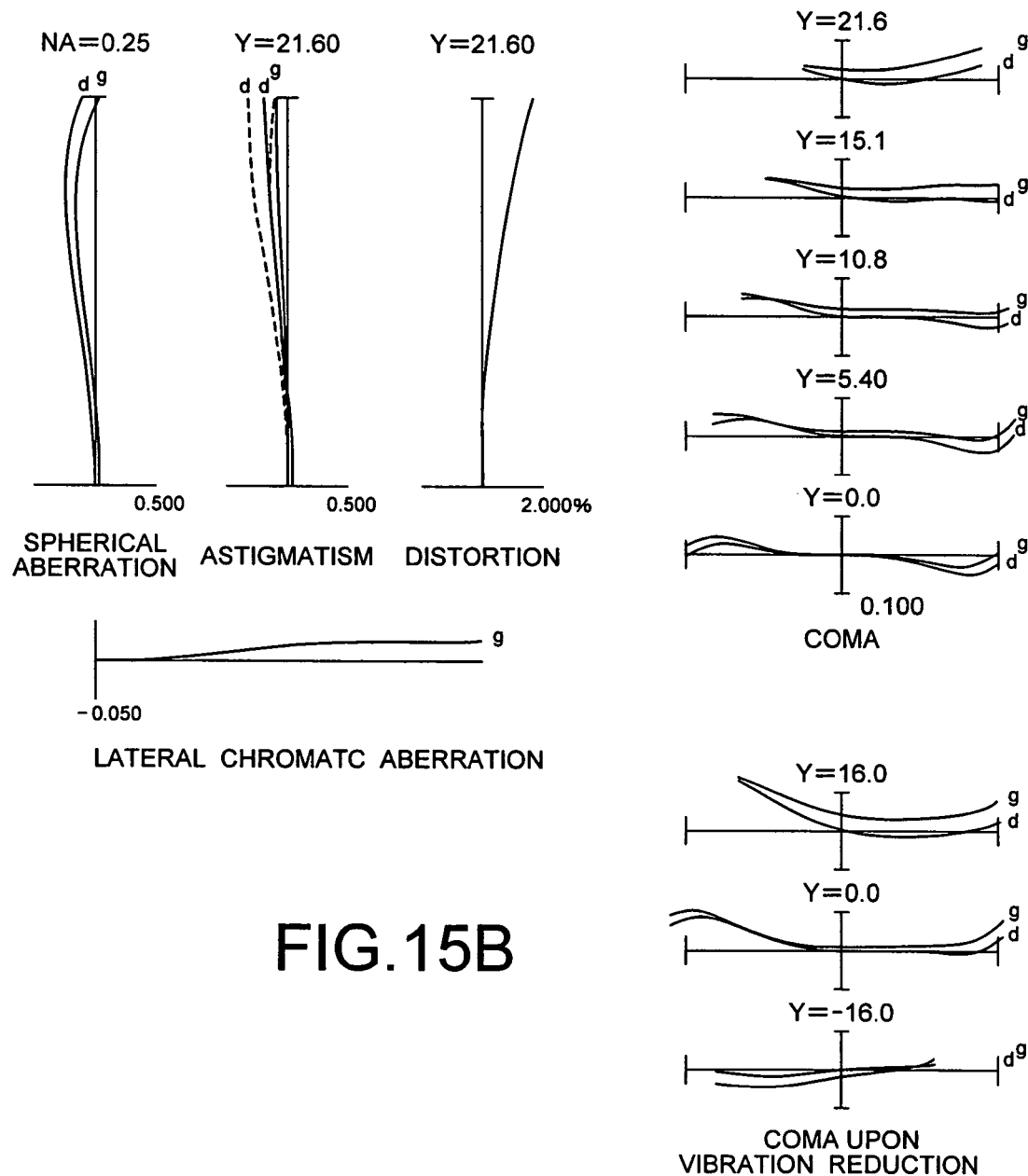
FIG. 15A shows various aberrations of the large-aperture-ratio internal focusing telephoto lens according to Example 5 focusing at a closest shooting distance and FIG. 15B shows coma of the large-aperture-ratio internal focusing telephoto lens according to Example 5 focusing at a closest shooting distance upon vibration reduction.

FIG. 14A shows various aberrations of the large-aperture-ratio internal focusing telephoto lens according to Example 5 focusing at infinity. FIG. 14B shows coma of the large-aperture-ratio internal focusing telephoto lens according to Example 5 focusing at infinity upon vibration reduction. FIG. 15A shows various aberrations of the large-aperture-ratio internal focusing telephoto lens according to Example 5 focusing at a closest shooting distance. FIG. 15B shows coma of the large-aperture-ratio internal focusing telephoto lens according to Example 5 focusing at a closest shooting distance upon vibration reduction.

As is apparent from respective graphs, the large-aperture-ratio internal focusing telephoto lens according to Example 5 shows superb optical performance correcting various aberrations.

EXAMPLE 6

Figure 16:
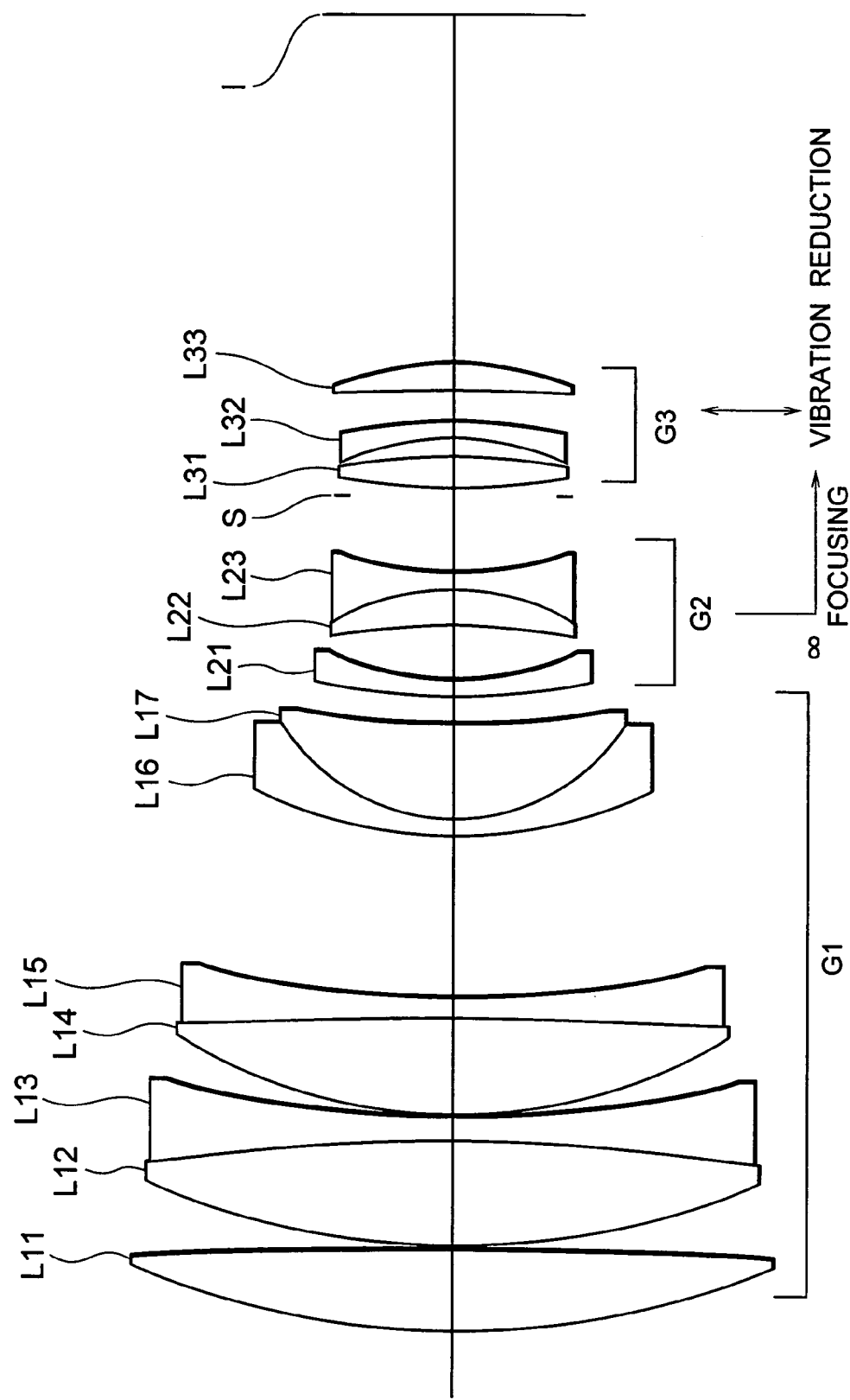
FIG. 16 is a diagram showing a sectional view of a large-aperture-ratio internal focusing telephoto lens according to Example 6 of the present invention.

FIG. 16 is a diagram showing a sectional view of a large-aperture-ratio internal focusing telephoto lens according to Example 6 of the present invention.

In FIG. 16, the large-aperture-ratio internal focusing telephoto lens is composed of, in order from an object, a first lens group G1 having positive refractive power, a second lens group G2 having negative refractive power, an aperture stop S, and a third lens group G3 having positive refractive power. The first lens group G1 is composed of, in order from the object, a double convex positive lens L11, a cemented lens constructed by a double convex positive lens L12 cemented with a double concave negative lens L13, a cemented lens constructed by a double convex positive lens L14 cemented with a double concave negative lens L15, and a cemented lens constructed by a negative meniscus lens L16 having a convex surface facing to the object cemented with a positive meniscus lens L17 having a convex surface facing to the object. The second lens group G2 is composed of, in order from the object, a negative meniscus lens L21 having a convex surface facing to the object, and a cemented lens constructed by a positive meniscus lens L22 having a concave surface facing to the object cemented with a double concave negative lens L23. The third lens group G3 is composed of, in order from the object, a double convex positive lens L31, a negative meniscus lens L32 having a concave surface facing to the object, and a positive meniscus lens L33 having a concave surface facing to the object.

Upon changing focus from infinity to a close-range object, the second lens group G2 is moved along the optical axis. Upon carrying out vibration reduction, the third lens group G3 is moved perpendicularly to the optical axis as a whole so as to correct image blur on the image plane I.

Various values associated with Example 6 are listed in Table 6.

TABLE 6

[Specifications]

| | | |
|---|---|---|
| f = | | 195.000 |
| FNO = | | 1.84 |
| 2ω = | | 12.59° |

[Lens Data]

| | r | d | νd | nd | ng |
|---|---|---|---|---|---|
| 1) | 139.937 | 14.00 | 91.0 | 1.44679 | 1.45282 |
| 2) | −1455.324 | 0.30 | | | |
| 3) | 130.503 | 18.00 | 91.0 | 1.44679 | 1.45282 |
| 4) | −317.488 | 4.00 | 64.1 | 1.51680 | 1.52670 |
| 5) | 184.980 | 0.30 | | | |
| 6) | 88.964 | 16.00 | 91.0 | 1.44679 | 1.45282 |
| 7) | −1042.781 | 4.00 | 64.1 | 1.51680 | 1.52670 |
| 8) | 171.068 | 27.00 | | | |
| 9) | 69.668 | 3.00 | 44.4 | 1.61266 | 1.63007 |
| 10) | 33.038 | 17.00 | 82.5 | 1.49782 | 1.50527 |
| 11) | 215.342 | (d1) | | | |

TABLE 6-continued

| 12) | 112.059 | 3.00 | 57.5 | 1.67025 | 1.68468 |
|---|---|---|---|---|---|
| 13) | 49.241 | 9.00 | | | |
| 14) | −98.743 | 6.00 | 39.6 | 1.80454 | 1.83050 |
| 15) | −38.090 | 3.00 | 60.0 | 1.64000 | 1.65313 |
| 16) | 52.817 | (d2) | | | |
| 17) | ∞ | 1.20 | | Aperture Stop S | |
| 18) | 97.182 | 5.00 | 49.5 | 1.77279 | 1.79232 |
| 19) | −115.042 | 3.50 | | | |
| 20) | −40.783 | 3.00 | 31.6 | 1.75692 | 1.78801 |
| 21) | −85.521 | 5.00 | | | |
| 22) | −459.644 | 5.00 | 60.0 | 1.64000 | 1.65313 |
| 23) | −51.425 | B.f. | | | |

[Variable Distances]

| | Infinity | | Closest shooting distance |
|---|---|---|---|
| f = | 195.0000 | β = | −0.1235 |
| d1 = | 4.2055 | | 13.3625 |
| d2 = | 13.1103 | | 3.9533 |
| B.f. = | 57.8766 | | 57.7793 |

[Values for Conditional Expressions]

| νp − νn = | 38.11 |
|---|---|
| f1/f = | 0.61 |
| f1/(−f2) = | 3.0 |
| (−f2)/f = | 0.20 |

Figure 17A:
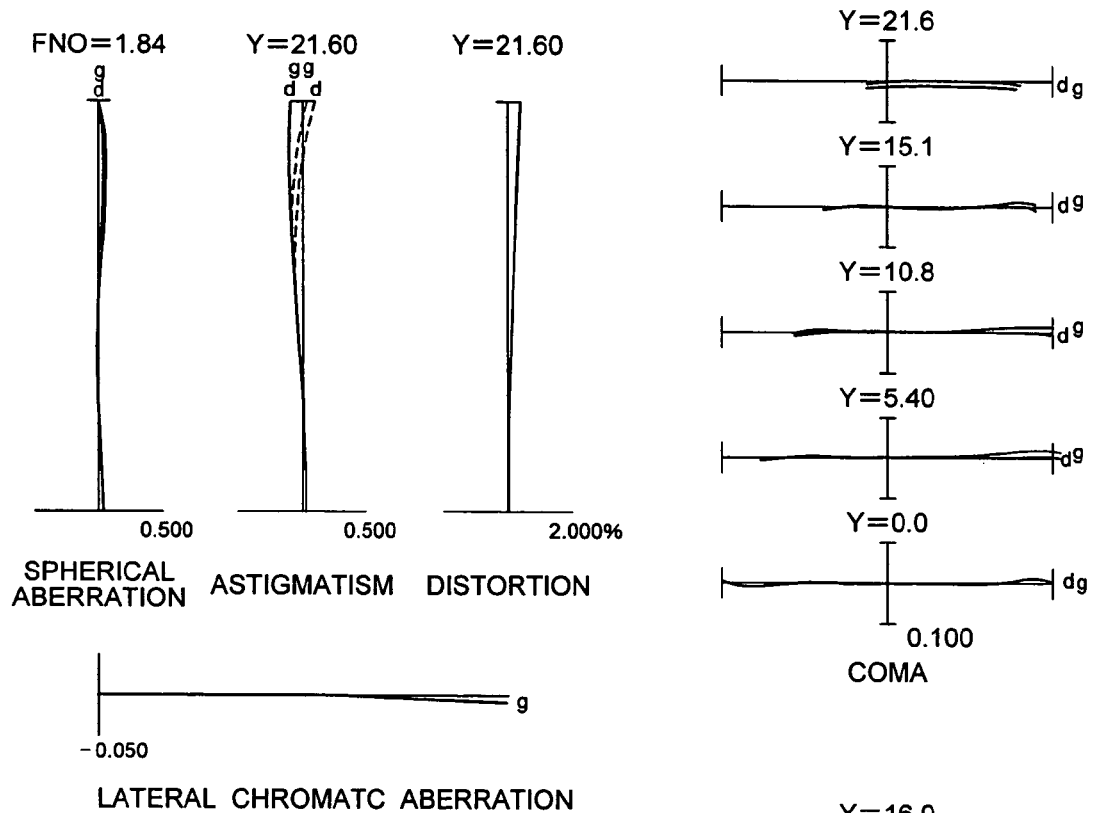
FIG. 17A shows various aberrations of the large-aperture-ratio internal focusing telephoto lens according to Example 6 focusing at infinity and FIG. 17B shows coma of the large-aperture-ratio internal focusing telephoto lens according to Example 6 focusing at infinity upon vibration reduction.
Figure 17B:
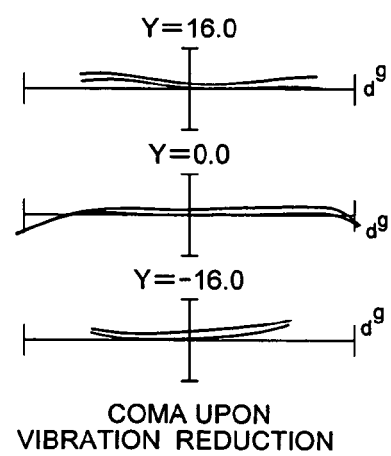
Figure 18A:
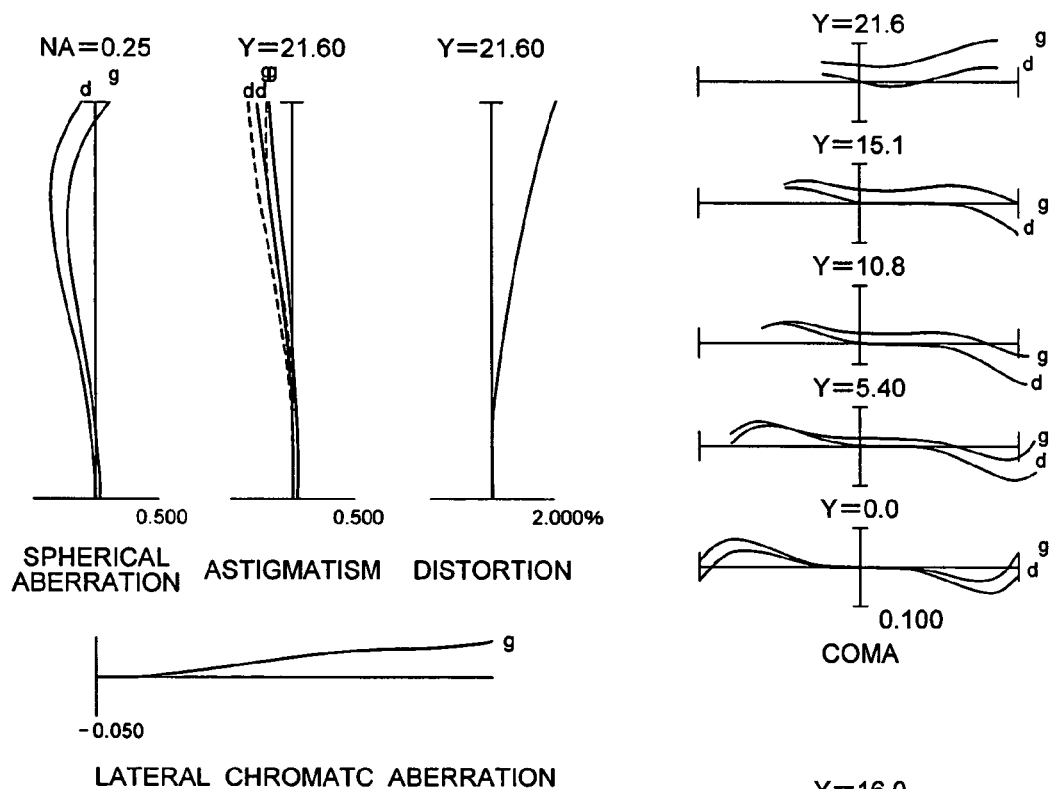
FIG. 18A shows various aberrations of the large-aperture-ratio internal focusing telephoto lens according to Example 6 focusing at a closest shooting distance and FIG. 18B shows coma of the large-aperture-ratio internal focusing telephoto lens according to Example 6 focusing at a closest shooting distance upon vibration reduction.
Figure 18B:
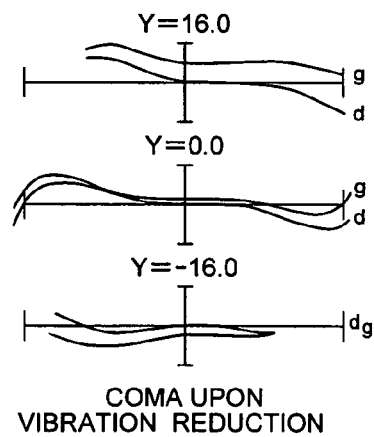

FIG. 17A shows various aberrations of the large-aperture-ratio internal focusing telephoto lens according to Example 6 focusing at infinity. FIG. 17B shows coma of the large-aperture-ratio internal focusing telephoto lens according to Example 6 focusing at infinity upon vibration reduction. FIG. 18A shows various aberrations of the large-aperture-ratio internal focusing telephoto lens according to Example 6 focusing at a closest shooting distance. FIG. 18B shows coma of the large-aperture-ratio internal focusing telephoto lens according to Example 6 focusing at a closest shooting distance upon vibration reduction.

As is apparent from respective graphs, the large-aperture-ratio internal focusing telephoto lens according to Example 6 shows superb optical performance correcting various aberrations.

As described above, the present invention provides a large-aperture-ratio internal focusing telephoto lens applicable to a wider photographing area by equipping a vibration reduction function capable to satisfactorily correct a camera shake and the like with securing superb optical performance.

Additional advantages and modification will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A large-aperture-ratio internal focusing telephoto lens comprising, in order from an object:
   a first lens group having positive refractive power;
   a second lens group having negative refractive power; and
   a third lens group having positive refractive power;
   the second lens group being moved along an optical axis upon changing focus from infinity to a close-range object, the first lens group having at least a first cemented lens and a second cemented lens and having at least one positive single lens element located at a position closest to the object side; and
   the following conditional expression is satisfied:

$2.7 < f1/(-f2) < 5$ where f1 denotes the focal length of the first lens group, and f2 denotes the focal length of the second lens group.

2. The large-aperture-ratio internal focusing telephoto lens according to claim 1, wherein either one of the cemented lens satisfies the following conditional expression:

$20 < \nu p - \nu n$ where νp denotes Abbe number of the positive lens element in the cemented lens, and νn denotes Abbe number of the negative lens element in the cemented lens.

3. The large-aperture-ratio internal focusing telephoto lens according to claim 2, wherein the first lens group satisfies the following conditional expression:

$0.4 < f1/f < 0.8$ where f denotes the focal length of the large-aperture-ratio internal focusing telephoto lens.

4. The large-aperture-ratio internal focusing telephoto lens according to claim 3, wherein the first lens group includes at least four positive lens elements and at least two negative lens elements.

5. The large-aperture-ratio internal focusing telephoto lens according to claim 4, wherein the second lens group includes at least two negative lens elements and at least two positive lens elements and the following conditional expression is satisfied:

$0.1 < (-f2)/f < 0.3$.

6. The large-aperture-ratio internal focusing telephoto lens according to claim 3, wherein the second lens group includes at least two negative lens elements and at least two positive lens elements and the following conditional expression is satisfied:

$0.1 < (-f2)/f < 0.3$.

7. The large-aperture-ratio internal focusing telephoto lens according to claim 2, wherein the first lens group includes at least four positive lens elements and at least two negative lens elements.

8. The large-aperture-ratio internal focusing telephoto lens according to claim 7, wherein the second lens group includes at least two negative lens elements and at least two positive lens elements and the following conditional expression is satisfied:

$0.1 < (-f2)/f < 0.3$.

9. The large-aperture-ratio internal focusing telephoto lens according to claim 2, wherein the second lens group includes at least two negative lens elements and at least two positive lens elements and the following conditional expression is satisfied:

$0.1 < (f2)/f < 0.3$.

10. The large-aperture-ratio internal focusing telephoto lens according to claim 1, wherein the first lens group satisfies the following conditional expression:

$0.4 < f1/f < 0.8$ where f denotes the focal length of the large-aperture-ratio internal focusing telephoto lens.

11. The large-aperture-ratio internal focusing telephoto lens according to claim 1, wherein the first lens group includes at least four positive lens elements and at least two negative lens elements.

12. The large-aperture-ratio internal focusing telephoto lens according to claim 1, wherein the second lens group includes at least two negative lens elements and at least two positive lens elements and the following conditional expression is satisfied:

$0.1 < (-f2)/f < 0.3$ where f denotes the focal length of the large-aperture-ratio internal focusing telephoto lens.

13. The large-aperture-ratio internal focusing telephoto lens according to claim 1, wherein the first cemented lens comprises, in order from the object, a positive lens element and a negative lens element, and the second cemented lens comprises, in order from the object, a negative lens element and a positive lens element.

14. The large-aperture-ratio internal focusing telephoto lens according to claim 13, wherein the first cemented lens comprises a double concave lens element.

15. The large-aperture-ratio internal focusing telephoto lens according to claim 1, wherein the first lens group comprises, in order from the object, the first single lens element, the first cemented lens, a second lens element and the second cemented lens.

16. The large-aperture-ratio internal focusing telephoto lens according to claim 1, wherein the large-aperture-ratio internal focusing telephoto lens constitutes a single-focus lens.

17. The large-aperture-ratio internal focusing telephoto lens according to claim 1, wherein the third lens group is moved perpendicularly to the optical axis.

18. The large-aperture-ratio internal focusing telephoto lens according to claim 1, wherein an f-number of the large-aperture-ratio internal focusing telephoto lens is 2.0 or less.

19. The large-aperture-ratio internal focusing telephoto lens according to claim 1, further comprising an aperture stop located between the second lens group and the third lens group.

20. The large-aperture-ratio internal focusing telephoto lens according to claim 1, wherein the second lens group has a cemented lens located at a position closest to an image surface side.

21. An optical apparatus comprising:
a large-aperture-ratio internal focusing telephoto lens according to claim 1.

22. A large-aperture-ratio internal focusing telephoto lens comprising, in order from an object:
a first lens group having positive refractive power;
a second lens group having negative refractive power;
a third lens group having positive refractive power;
the second lens group being moved along an optical axis of the large-aperture-ratio internal telephoto lens upon changing focus from infinity to a close-range object, the first lens group having at least a first cemented lens and a second cemented lens and having at least one positive single lens element located at a position closest to the object side; and
the following conditional expression is satisfied:

$0.1 < (-f2)/f < 0.3$ where f denotes the focal length of the large-aperture-ratio internal focusing telephoto lens, and f2 denotes the focal length of the second lens group.

23. The large-aperture-ratio internal focusing telephoto lens according to claim 22, wherein the first cemented lens comprises, in order from the object, a positive lens element and a negative lens element, and the second cemented lens comprises, in order from the object, a negative lens element and a positive lens element.

24. The large-aperture-ratio internal focusing telephoto lens according to claim 22, wherein the first lens group comprises, in order from the object, the first single lens element, the first cemented lens, a second lens element and the second cemented lens.

25. The large-aperture-ratio internal focusing telephoto lens according to claim 22, wherein an f-number of the large-aperture-ratio internal focusing telephoto lens is 2.0 or less.

26. An optical apparatus comprising:
a large-aperture-ratio internal focusing telephoto lens according to claim 22.

27. The large-aperture-ratio internal focusing telephoto lens according to claim 22, wherein the second lens group includes at least two negative lens elements and at least two positive lens elements.

28. The large-aperture-ratio internal focusing telephoto lens according to claim 22, wherein the second lens group includes at least four lens elements.

29. The large-aperture-ratio internal focusing telephoto lens according to claim 22, wherein the third lens group is moved perpendicularly to the optical axis.

30. A large-aperture-ratio internal focusing telephoto lens comprising, in order from an object:
a first lens group having positive refractive power and having at least a first cemented lens and a second cemented lens and having at least one positive single lens element located at a position closest to the object side;
a second lens group having negative refractive power;
a third lens group having positive refractive power;
the second lens group being moved along an optical axis of the large-aperture-ratio internal focusing telephoto lens upon changing focus from infinity to a close-range object; and an f-number of the large-aperture-ratio internal focusing telephoto lens is less than 2.0.

31. The large-aperture-ratio internal focusing telephoto lens according to claim 30, wherein the first cemented lens comprises, in order from the object, a positive lens element and a negative lens element, and the second cemented lens comprises, in order from the object, a negative lens element and a positive lens element.

32. The large-aperture-ratio internal focusing telephoto lens according to claim 30, wherein the first lens group comprises, in order from the object, the first single lens element, the first cemented lens, a second lens element and the second cemented lens.

33. An optical apparatus comprising:
a large-aperture-ratio internal focusing telephoto lens according to claim 30.

34. The large-aperture-ratio internal focusing telephoto lens according to claim 30, wherein the third lens group is moved perpendicularly to the optical axis.

35. A method for forming an image of an object by an optical system that includes, in order from the object, a first lens group, a second lens group and a third lens group, the method comprising steps of:
providing the first lens group with positive refractive power and at least two cemented lenses and at least one positive single lens element located at a position closest to the object side;
providing the second lens group with negative refractive power;
providing the third lens group with positive refractive power;

changing focus of the optical system from infinity to a close-range object by moving the second lens group; and satisfying the following conditional expression:

$$2.7 < f1/(-f2) < 5$$

where f1 denotes the focal length of the first lens group, and f2 denotes the focal length of the second lens group.

36. The method according to claim 35, wherein the third lens group is moved in a direction perpendicular to an optical axis.

37. A method for forming an image of an object by an optical system that includes, in order from the object, a first lens group, a second lens group and a third lens group, the method comprising steps of:

providing the first lens group with positive refractive power and at least two cemented lenses and at least one positive single lens element located at a position closest to the object side;

providing the second lens group with negative refractive power;

providing the third lens group with positive refractive power;

changing focus of the optical system from infinity to a close-range object by moving the second lens group along an optical axis; and satisfying the following conditional expression:

$$0.1 < (-f2)/f < 0.3$$

where f denotes the focal length of the optical system, and f2 denotes the focal length of the second lens group.

38. The method according to claim 37, wherein the third lens group is moved in a direction perpendicular to the optical axis.

39. A method for forming an image of an object, comprising steps of:

providing an optical system that has an f-number of less than 2.0 and that comprises, in order from an object, a first lens group having positive refractive power and at least two cemented lenses and at least one positive single lens element located at a position closest to the object side, a second lens group having negative refractive power, and a third lens group having positive refractive power; and using the optical system to form the image of the object.

40. The method according to claim 39, wherein the third lens group is moved in a direction perpendicular to an optical axis.

41. A large-aperture-ratio internal focusing telephoto lens comprising, in order from an object:

a first lens group having positive refractive power;

a second lens group having negative refractive power; and a third lens group having positive refractive power;

the second lens group having at least four lens elements and being moved along an optical axis upon changing focus from infinity to a close-range object, and the first lens group having at least a first cemented lens and a second cemented lens and having at least one positive single lens element located at a position closest to the object side.

42. The large-aperture-ratio internal focusing telephoto lens according to claim 41, wherein either one of the cemented lens satisfies the following conditional expression:

$$20 < vp - vn < 40.8$$

where vp denotes Abbe number of the positive lens element in the cemented lens, and vn denotes Abbe number of the negative lens element in the cemented lens.

43. The large-aperture-ratio internal focusing telephoto lens according to claim 41, wherein the third lens group is moved perpendicularly to the optical axis.

44. A large-aperture-ratio internal focusing telephoto lens comprising, in order from an object:

a first lens group having positive refractive power;

a second lens group having negative refractive power; and a third lens group having positive refractive power;

the second lens group being moved along an optical axis upon changing focus from infinity to a close-range object, the first lens group having at least a first cemented lens and a second cemented lens and having at least one positive single lens element located at a position closest to the object side; and the following conditional expression is satisfied:

$$20 < vp - vn < 40.8$$

where vp denotes Abbe number of the positive lens element in the cemented lens, and vn denotes Abbe number of the negative lens element in the cemented lens.

45. The large-aperture-ratio internal focusing telephoto lens according to claim 44, wherein the second lens group includes at least two negative lens elements and at least two positive lens elements.

46. The large-aperture-ratio internal focusing telephoto lens according to claim 44, wherein the third lens group is moved perpendicularly to the optical axis.

* * * * *